United States Patent
Theogarajan et al.

(10) Patent No.: US 6,308,257 B1
(45) Date of Patent: Oct. 23, 2001

(54) METHOD AND APPARATUS FOR GENERATING BOUNDARY MARKERS FOR AN INSTRUCTION STREAM INCLUDING VARIABLE-LENGTH INSTRUCTIONS

(75) Inventors: Luke S. K. Theogarajan, Beaverton; James W. Dukes, Hillsboro; Ken V. Diep, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/295,748

(22) Filed: Apr. 20, 1999

(51) Int. Cl.[7] .................... G06F 9/40; G06F 12/04
(52) U.S. Cl. ................... 712/210; 712/204; 712/213; 711/213; 711/209
(58) Field of Search ................... 712/300, 210, 712/23, 24, 216, 228, 204, 209, 213, 223, 229, 212; 382/321, 288, 309; 358/426; 711/213, 209

(56) References Cited

U.S. PATENT DOCUMENTS

| 3,602,901 | * | 8/1971 | Jen ................................. 711/110 |
| 5,450,605 | * | 9/1995 | Grochowski ..................... 712/23 |
| 5,452,101 | | 9/1995 | Keith .............................. 358/426 |
| 5,535,347 | | 7/1996 | Grochowski et al. ............ 712/210 |
| 5,537,629 | | 7/1996 | Brown et al. .................... 712/210 |
| 5,586,276 | | 12/1996 | Grochowski ..................... 712/204 |
| 5,586,277 | | 12/1996 | Brown et al. .................... 712/210 |
| 5,740,392 | | 4/1998 | Brennan .......................... 712/210 |
| 5,758,116 | | 5/1998 | Lee et al. ......................... 712/210 |
| 5,778,246 | | 7/1998 | Brennan .......................... 712/23 |
| 5,821,887 | | 10/1988 | Zhu ................................. 341/67 |
| 5,822,555 | | 10/1988 | Brown et al. .................... 712/204 |

\* cited by examiner

Primary Examiner—Daniel H. Pan
(74) Attorney, Agent, or Firm—Blakely, Sokoloff, Taylor & Zafman LLP

(57) ABSTRACT

A method of generating boundary markers, for an instruction stream including variable-length instructions, includes generating a number of sets of potential boundary markers for a predetermined set of bytes within the instruction stream. Each set of potential boundary markers is generated based on a respective assumption regarding a boundary byte position within the predetermined set of bytes. For example, a number of sets of potential boundary markers may be generated based on assumptions that respective byte positions within the predetermined set of bytes include the start byte of an instruction. A further set of potential boundary markers may be generated based on an assumption that none of the byte positions within the predetermined set of bytes includes a start byte of instruction. A set of boundary markers, from the number of sets of potential boundary markers, is selected as a valid set of boundary markers when it is determined that an assumption, upon which the relevant set was generated, is in fact valid.

65 Claims, 20 Drawing Sheets

METHOD AND APPARATUS FOR GENERATING BOUNDARY MARKERS FOR AN INSTRUCTION STREAM INCLUDING VARIABLE-LENGTH INSTRUCTIONS

FIELD OF THE INVENTION

The present invention pertains generally to the field of computer systems and more particularly to methods and apparatus for generating boundary markers that allow a processor to identify boundaries between variable-length instructions in an instruction stream to be decoded.

BACKGROUND OF THE INVENTION

Processors (including, but not limited to, general and special purpose microprocessors, micro-controllers and Digital Signal Processors (DSPs)) typically include execution units that execute of sequence of instructions, termed micro-instructions, derived from a computer program. Many computer programs are written in a high-level language that is not directly executable by the central processing unit (CPU) of a computer and the instructions of such programs must accordingly be decoded into a form suitable for execution by the CPU. For example, a program may be written in a high-level language such as C, C++ or Java, and then complied into a corresponding sequence of macro-instructions, which are in turn decoded into micro-instructions for eventual execution. Programs can of course be written directly as a series of macro-instructions (i.e., machine code).

Macro-instructions are commonly stored as contiguous data blocks in a memory resource, such as main memory (e.g., RAM) or in a cache, for retrieval and supply to a decoder unit within a processor for decoding into micro-instructions. To enable the decoder unit successfully to decode macro-instructions, it will be appreciated that is necessary to identify instruction boundaries within retrieved data blocks, that constitute the instruction stream, that indicate where one macro-instruction ends and the next begins.

The task of identifying such instruction boundaries by processors having Complex Instruction Set Computer (CISC) architectures, such as the Intel Architecture (IA) developed by Intel Corporation of Santa Clara, Calif., is complicated by the use of a variable-length instruction set (e.g., the Intel Architecture (IA) instruction set). Specifically, in Reduced Instruction Set Computer (RISC) processor architectures and instruction sets, macro-instructions typically have a fixed length, in which case the boundaries between instructions can be determined with relative ease once an initial boundary is identified, as each instruction has a known length. For a variable-length instruction set, once an initial boundary location is identified, the length of each macro-instruction must be ascertained to identify subsequent instruction boundaries. The task of identifying boundaries is further complicated by a variable-length instruction set that, for the purposes of supporting legacy programs, supports multiple data and addressing sizes. For example, this capability is achieved in the IA instruction set by the use of length-changing prefixes that alter the address and operand sizes (or lengths) of instructions from 16 to 32 bits, and vice versa.

SUMMARY OF THE INVENTION

According to the present invention, there is provided a method of generating boundary markers for an instruction stream including variable-length instructions. A plurality of sets of potential boundary markers are generated for a predetermined set of bytes within the instruction stream, each set of potential boundary markers being generated based on a respective assumption regarding a boundary byte position within the predetermined set of bytes. A set of boundary markers, from the plurality of sets of potential boundary markers, is selected as a valid set of boundary markers.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for generating boundary markers for an instruction stream including variable-length instructions are described. In the following description, for the purposes of explanation, numerous specific details are set forth in order to provide a thorough understanding of the present invention. It will be evident, however, to one skilled in the art that the present invention may be practiced without these specific details.

Macro-Instruction Format

Figure 1:
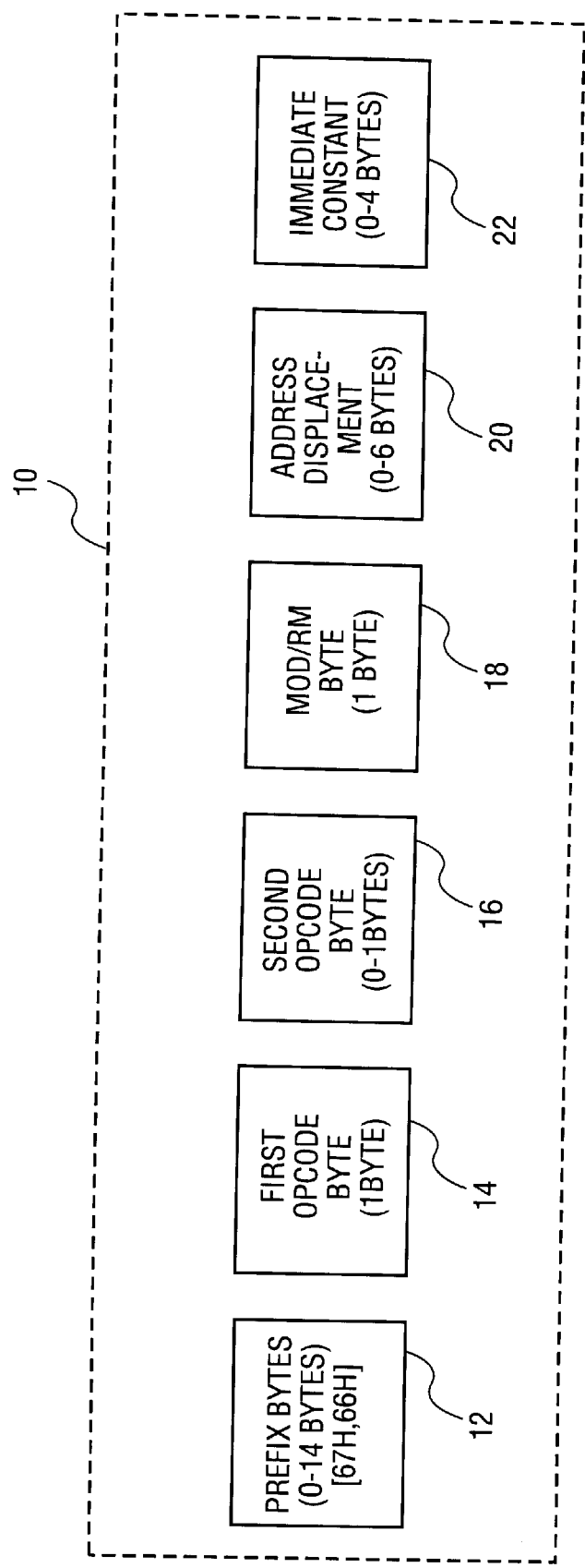
FIG. 1 is a diagrammatic representation of an exemplary macro-instruction consisting of bytes that may be on the marked and decoded according to the teachings of the present invention.

FIG. 1 is a diagrammatic representation of an exemplary macro-instruction 10 consisting of bytes that may be boundary marked and decoded according to teachings of the present invention. Specifically, FIG. 1 illustrates the format of an exemplary macro-instruction forming the part of the Intel Architecture (IA) instruction set, as developed by Intel Corporation of Santa Clara, Calif. For the purposes of the present specification, the terms "macro-instruction" and "instruction" shall both be taken to refer to what is commonly understood to be a macro-instruction and not a micro-instruction.

As defined within the Intel Architecture instruction set, an exemplary macro-instruction 10 may comprises a first opcode byte 14 (1 byte in length), a second opcode byte 16 (0–1 bytes in length), a Mod/RM Operand Specifier 18 (0–2 bytes in length), an Address Displacement 20 (0–6 bytes in length) and an Intermediate Constant 22 (0–4 bytes in length). Only the first opcode byte 14 is required within a macro-instruction 10, and a macro-instruction 10 may range in length from one (1) to fifteen (15) bytes. The first opcode byte 14 may be preceded by 0–14 prefix bytes 12 that modify the operation of the macro-instruction. For example, the prefix bytes 12 may override a default segment, indicate a string instruction loop, or indicate a bus LOCK cycle while executing the macro-instruction. A two byte opcode, for example, is identified by a prefix byte 12 having a hexadecimal value of [0F] that precedes the opcode.

16 and 32-bit Modes of Operation

Current processors, such as for example the Pentium Pro® or the Pentium II® processors, may operate in either a 16- or 32-bit mode. Each macro-instruction may be decoded and executed as:

1. A fixed 8-bit data/address instruction;
2. A fixed 16-bit data/address instruction; or
3. A variable 16- or 32-bit data/address instruction, as determined by a mode operation bit (commonly termed a D-bit) within the IA processor.

Of particular interest to the present invention are operand size and address size override prefixes that, for the IA instruction set, comprise the hexadecimal values 66H and 67H respectively. If one (or more) of these size override prefixes precedes the first opcode byte 14 of a macro-instruction that is susceptible to the presence of such a prefix, the operand and/or address size (i.e., the D-bit) will be toggled from a default size in accordance with such a prefix. For example, a 16-bit instruction that has a 16-bit default operand size will be toggled to specify a 32-bit operand size by the presence of a 66H prefix, and a 32-bit instruction that has a 32-bit default operand size will be toggled to specify a 16-bit operand size by the presence of a 66H prefix. Similarly, a 16-bit instruction that has a 16-bit default address size will be toggled to specify a 32-bit address size by the presence of a 67H prefix, and a 32-bit instruction that has a 32-bit default address size will be toggled to specify a 16-bit address size by the presence of a 66H prefix.

The length of macro-instructions comprising the IA instruction set may be determined by examining the first four (4) bytes of the relevant macro-instruction, namely the first opcode byte 14, and the proceeding three (3) bytes, together with the current state of the D-bit, as will described in further detail below.

Microprocessor Architecture

Figure 2:
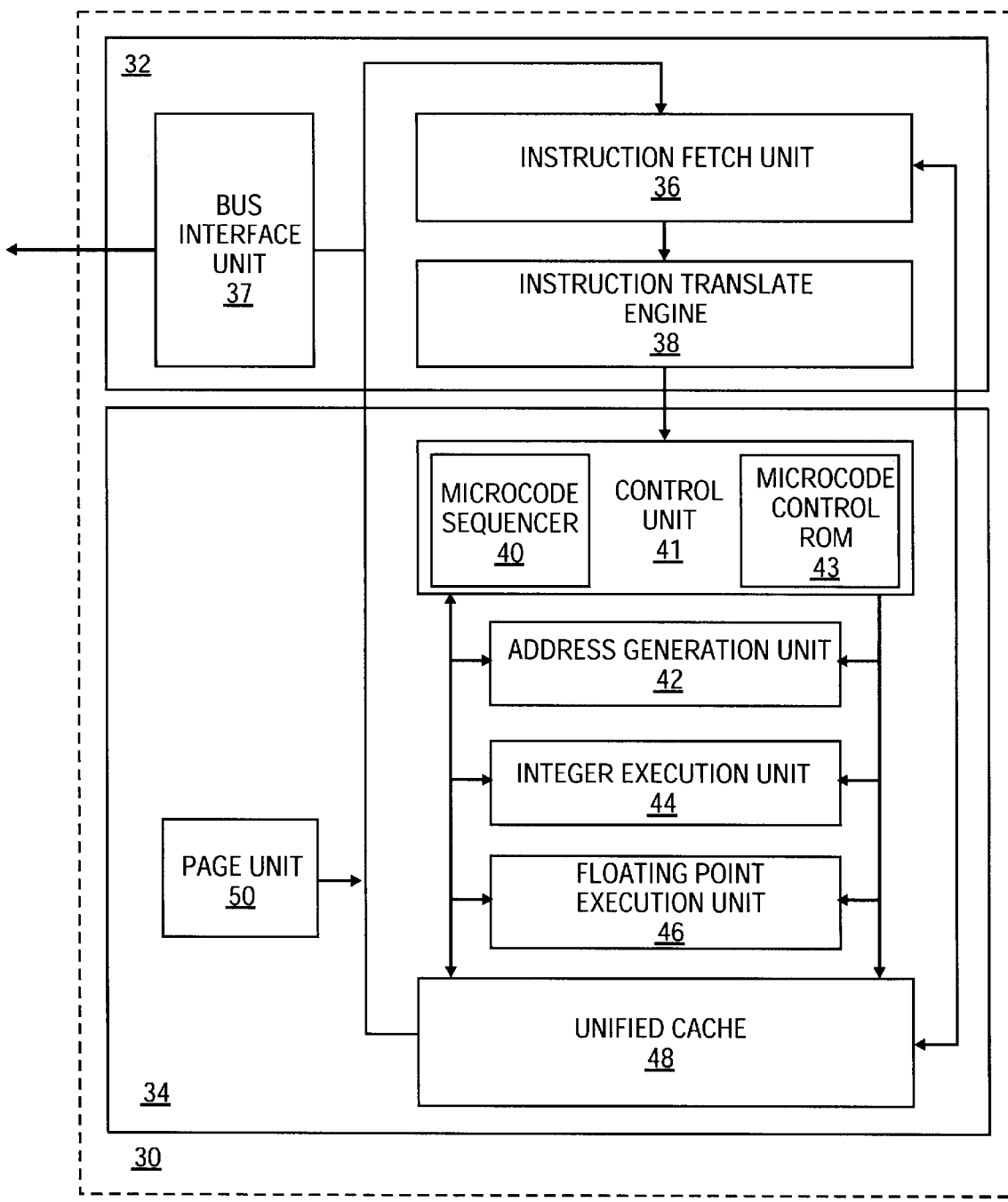
FIG. 2 is a block diagram showing the architecture of an exemplary microprocessor within which the present invention may be implemented.

FIG. 2 is a block diagram showing an exemplary microprocessor 30 within which the present invention may be implemented. The microprocessor 30 is pipelined, and includes in-order front-end circuitry 32 and out-of-order back-end circuitry 34. The front-end circuitry 32 comprises an instruction fetch engine 36 that retrieves macro-instructions, which may conform to the format illustrated in FIG. 1, via a bus interface unit 37 from a main memory (not shown) associated with the microprocessor 30, or from an internal unified cache 48 that caches both macro-instructions and data. In an alternative embodiment, the cache 48 may be located downstream of an instruction translate engine 38 and make cache decoded micro-instructions derived from macro-instructions. Macro-instructions retrieved by the instruction fetch engine 36 are then propagated to the instruction translate engine 38 that translates macro-instructions into corresponding micro-instructions. Micro-instructions are issued from the instruction translate engine 38 to a control unit 40 (also referred to as the microcode unit), that forms part of the back-end circuitry 34, and includes a microcode sequencer (MS) 41 and a microcode control Read Only Memory (ROM) 43. The control unit 40 interprets the micro-instructions sent to it, and handles exceptions, breakpoints and interrupts. From the control unit 40, micro-instructions are dispatched to a pipeline including an address generation unit 42, an integer execution unit 44 (also known as an Arithmetic/Logic Unit (ALU)) and/or a floating point execution unit 46.

The microprocessor 30 further includes a page unit 50 that translates linear addresses into physical addresses, and includes at least one Translation Lookaside Buffer (TLB) for this purpose.

Figure 3:
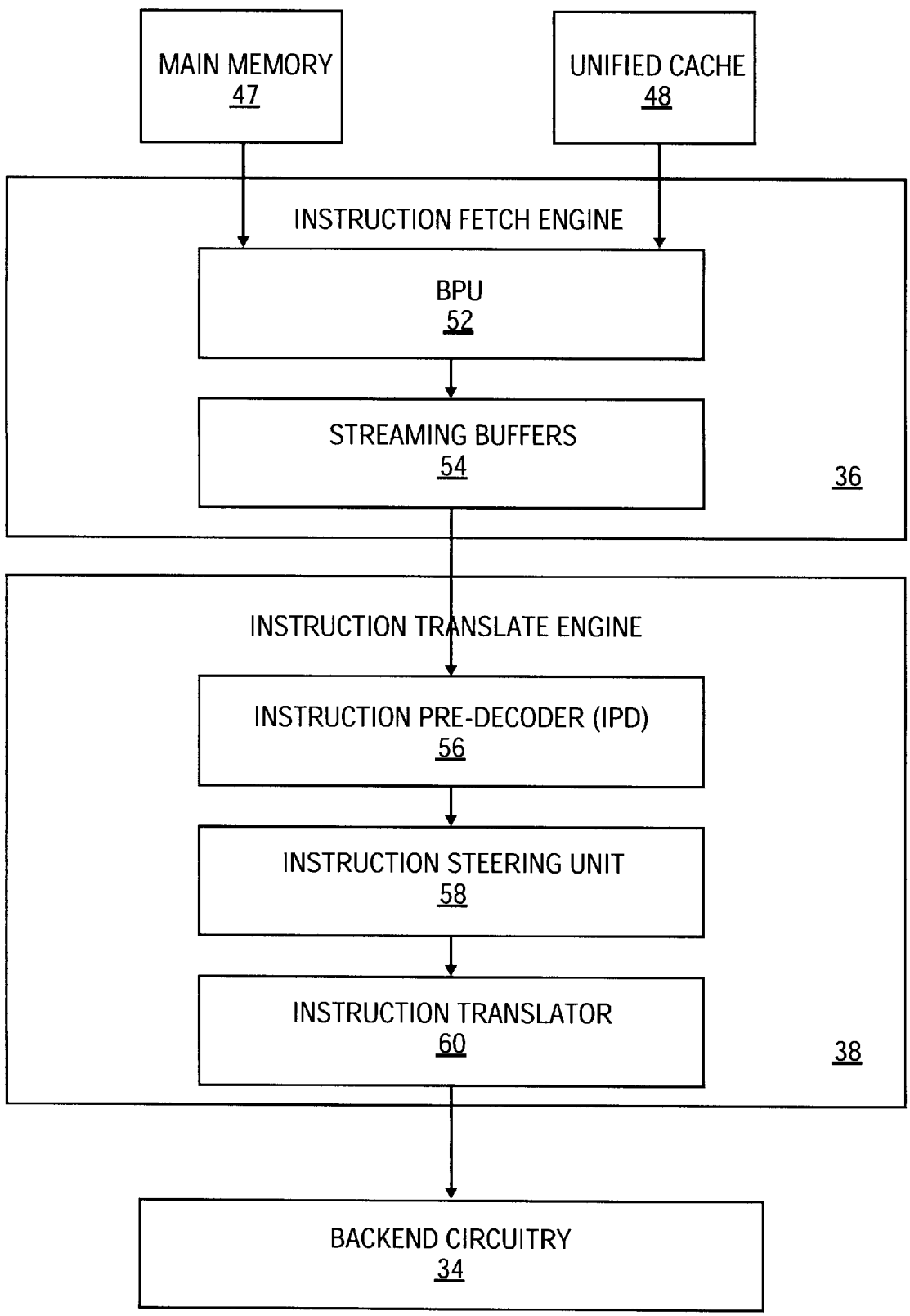
FIG. 3 is a block diagram showing architectural details regarding an instruction fetch engine and an instruction translate engine, according to exemplary embodiment of the present invention, that may be incorporated into the microprocessor shown in FIG. 2.

FIG. 3 is a block diagram showing further details regarding the instruction fetch engine 36 and the instruction translate engine 38 of the exemplary microprocessor shown in FIG. 2. The instruction fetch engine 36 is shown to include a Branch Prediction Unit (BPU) 52 that examines macro-instructions received from a main memory 47 or the unified cache 48 and provides speculative branch predictions for branch instructions encountered in the instruction stream based on, for example, a branch history maintained by the BPU 52. Streaming buffers 54 buffer macro-instructions before dispatch to an Instruction Pre-Decoder (IPD) 56 within the instruction translate engine 38.

Figure 4:
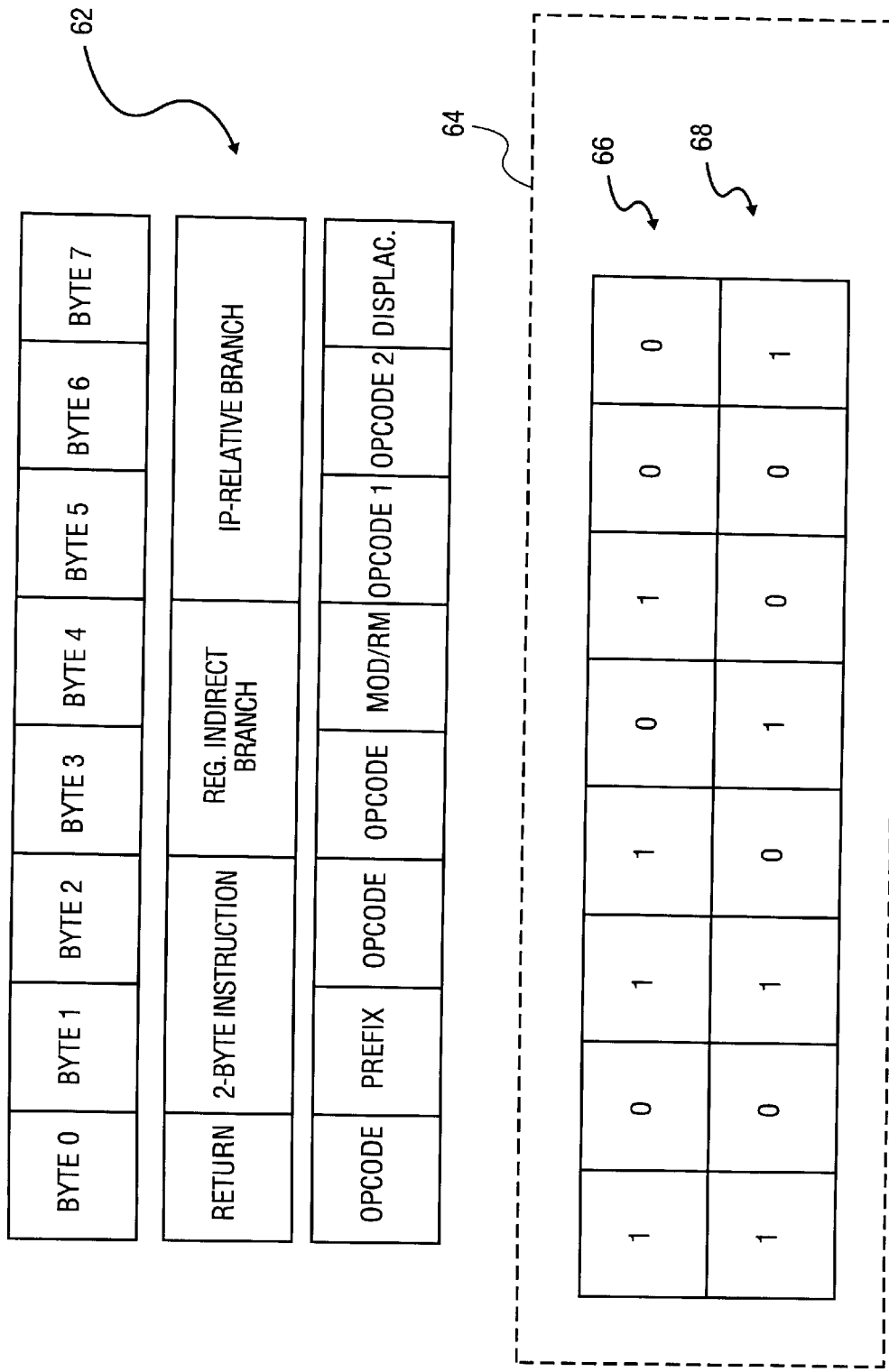
FIG. 4 shows exemplary byte-marking vectors that may be generated according to the teachings of the present invention.

The IPD 56 is responsible for changing the instruction stream from byte-based information to instruction-based information. Specifically, the IPD 56 generates a byte-marking (or boundary marking) vector that marks bytes of the instruction stream that comprise first (START) or last (END) bytes of an instruction. The byte-marking vector is necessary as the instruction fetch engine 36 fetches contiguous blocks of instruction data (e.g., 8, 16 or 32 bytes) from either the main memory 47 or unified cache 48, these bytes then being propagated in parallel through the microprocessor 30. The microprocessor 30 requires some mechanism for identifying instruction boundaries within these contiguous blocks of instruction data, and the byte-marking vector provides this mechanism. An exemplary 8-byte macro-instruction block 62 and an associated byte-marking vector 64, as generated by the IPD 56, are illustrated in FIG. 4. The byte-marking vector 64 comprises a first (or START) byte marking vector 66, which contains set bits corresponding to the first bytes of instructions within the macro-instruction block 62, and a last (or END) byte marking vector 68, which contains set bits corresponding to the last bytes of instructions within the macro-instruction block 62.

Macro-instruction data blocks (or chunks) 62 and accompanying byte-marking vectors 64 are the propagated from the IPD 56 to an Instruction Steering (IS) unit 58. The IS unit 58 rotates and aligns the macro-instruction data utilizing the byte-making vectors so that macro-instructions are properly fed to the Instruction Translator (IT) unit 60 for translation into corresponding micro-instructions. The generated micro-instructions are then issued from the IT unit 60 to the back-end circuitry 34 for execution.

The Instruction Pre-Decoder (IPD)

Figure 5:
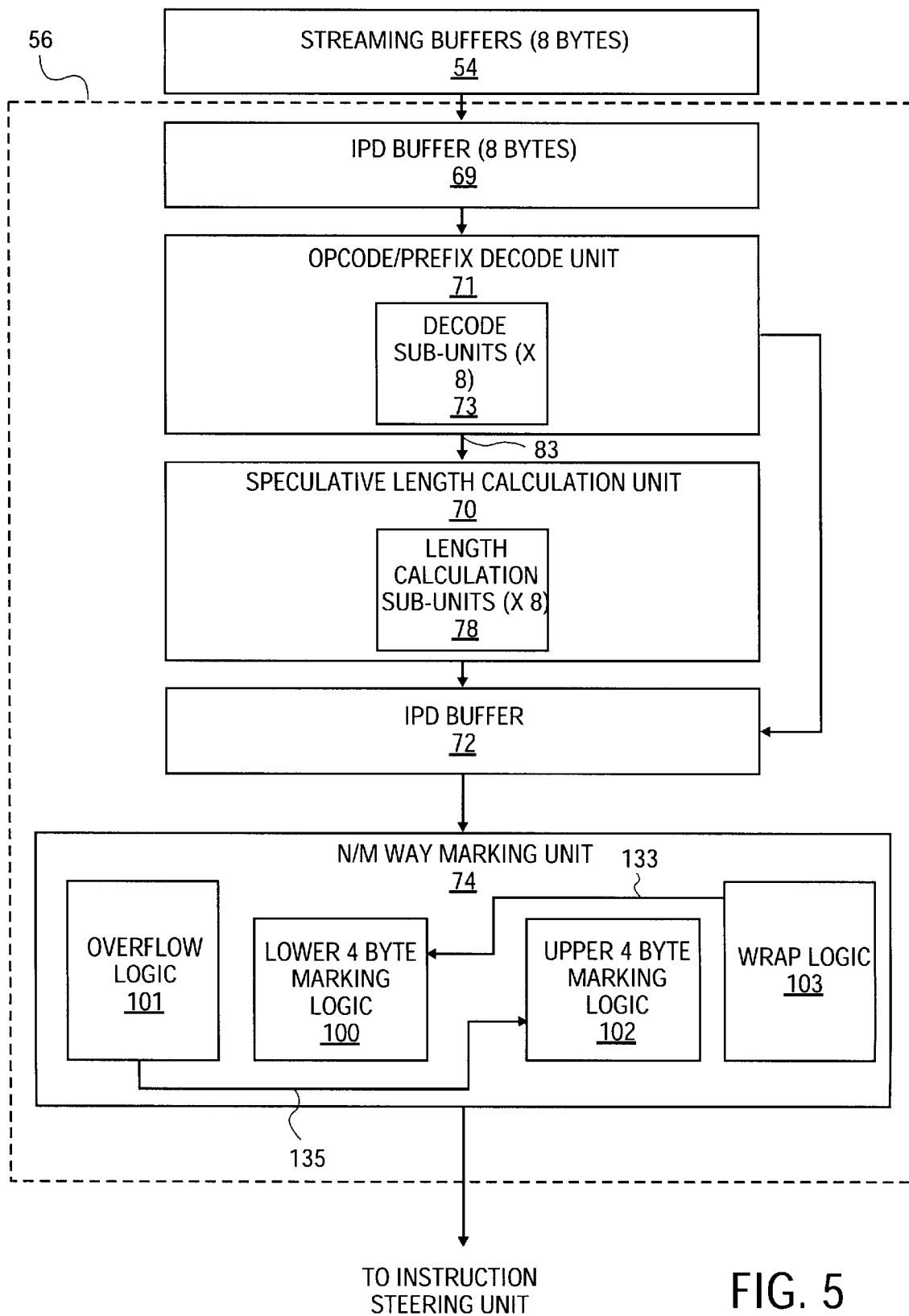
FIG. 5 is a block diagram showing architectural details of an instruction pre-decoder (IPD) according to exemplary embodiment of the present invention.
Figure 6:
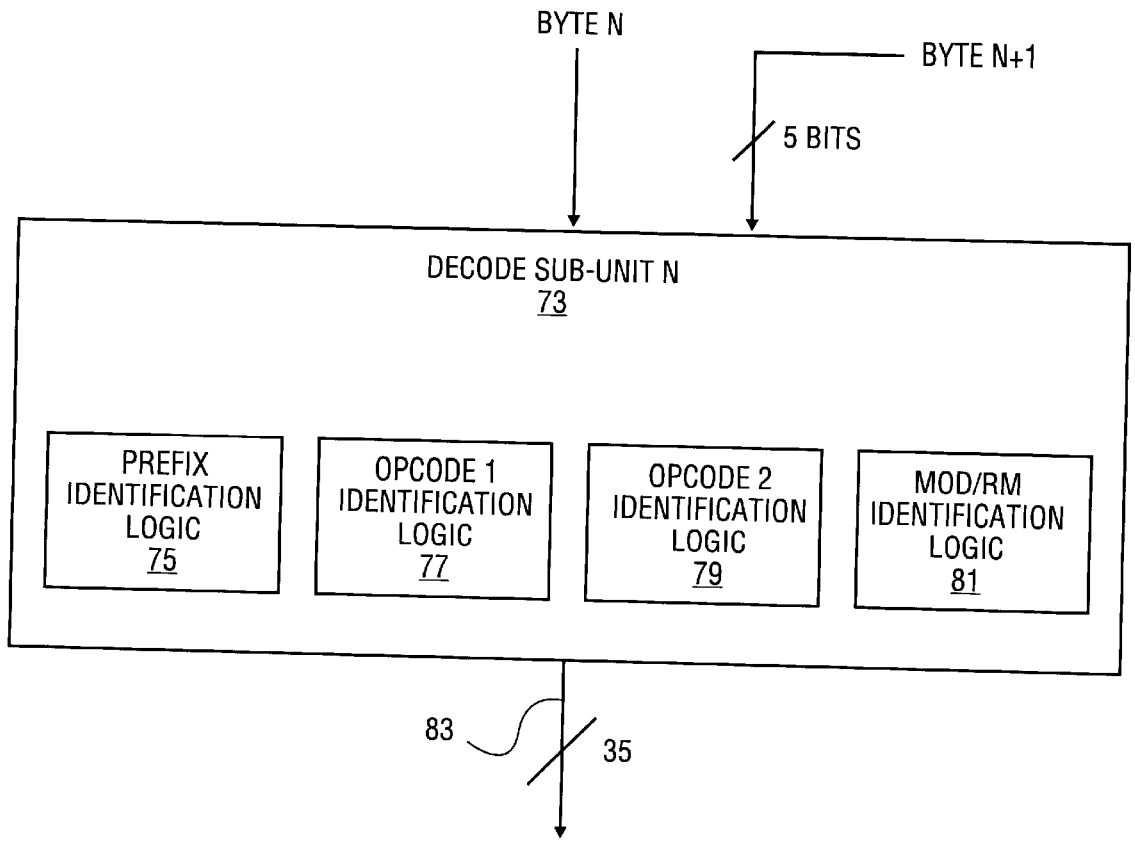
FIG. 6 is a block diagram showing architectural details of an exemplary decode sub-unit, according to the present invention, that may be included within an opcode/prefix decode unit located within the instruction pre-decoder illustrated in FIG. 5.

FIG. 5 is a block diagram showing further details regarding the construction of the IPD 56, according to one exemplary embodiment of the invention. The IPD 56 is shown to receive 8 bytes of instruction information (which for the purposes of the present specification may conveniently be termed a "8-byte block ") from the streaming buffers 54 into a buffer 69, from where the 8 bytes of information are forwarded to an opcode/prefix decode unit 71 that decodes each byte to generate 35 decode control signals 83 for each byte that are utilized by a speculative length calculation unit 70 to speculatively determined the length of an instruction assumed to commence at each byte. FIG. 5 illustrates the opcode/prefix decode unit 71 as including eight decode sub-units 73, each of the decode sub-units 73 being dedicated to providing 35 decode control signals 83 for one of the 8 bytes received from the buffer 69. FIG. 6 is a block diagram illustrating further structural details regarding each of the decode sub-units 73. Each decode sub-unit 73 is shown to include prefix identification logic 75, opcode (1) identification logic 77, opcode (2) identification logic 79 and mod/RM identification logic 81 that operate to identify a byte allocated to the respective decode sub-unit 73 as potentially being a prefix byte 12, a first opcode byte 14, a second opcode byte 16 of a two-byte opcode, or a Mod/RM Operand Specifier 18. Table 1 below lists the 35 decode control signals 83 that are generated by each of the decode sub-units 73:

TABLE 1

| SIGNAL | DESCRIPTION |
| --- | --- |
| Prefix0F | Identified byte as the first byte of a 2-byte opcode |
| Prefix66 | Identified byte as an operand size override prefix |
| Prefix67 | Identified byte as an address size override prefix |
| Prefix | Identified byte as one of the 11 valid prefixes |
| *Op1Jmp | Identifies a 1-byte opcode branch |
| *Op2Jmp | Identifies a 2-byte opcode branch |
| Op1NoMod0 | Identifies a 1-byte opcode, no MOD/RM byte, and 0 immediate bytes |
| Op1NoMod1 | Identifies a 1-byte opcode, no MOD/RM byte, and 1 immediate bytes |
| Op1NoMod3 | Identifies a 1-byte opcode, no MOD/RM byte, and 3 immediate bytes |
| Op1NoMod2 | Identifies a 1-byte opcode, no MOD/RM byte, and 2 immediate bytes |
| Op1NoMod4 | Identifies a 1-byte opcode, no MOD/RM byte, and 4 immediate bytes |
| Op1NoMod6 | Identifies a 1-byte opcode, no MOD/RM byte, and 6 immediate bytes |
| *Op1ModImm0 | Identifies a 1-byte opcode with a MOD/RM byte, and 0 immediate bytes |
| *Op1ModImm1 | Identifies a 1-byte opcode with a MOD/RM byte, and 1 immediate bytes |
| *Op1ModImm2 | Identifies a 1-byte opcode with a MOD/RM byte, and 2 immediate bytes |
| Op1ModImm4 | Identifies a 1-byte opcode with a MOD/RM byte, and 4 immediate bytes |
| Op1Effect66 | Identifies a 1-byte opcode which is affected by the 66h prefix |
| Op1Effect67 | Identifies a 1-byte opcode which is affected by the 67h prefix |
| Op2NoMod0 | Identifies a 2-byte opcode with no Mod/RM byte, and 0 immediate bytes |
| Op2NoMod1 | Identifies a 2-byte opcode with no Mod/RM byte, and 1 immediate bytes |
| Op2NoMod2 | Identifies a 2-byte opcode with no Mod/RM byte, and 2 immediate bytes |
| Op2NoMod4 | Identifies a 2-byte opcode with no Mod/RM byte, and 4 immediate bytes |
| Op2ModFollow | Identifies a 2-byte opcode followed by a Mod/RM byte |
| Op2ModImm1 | Identifies a 2-byte opcode followed by a Mod/RM byte, then 1 immediate byte |
| *Mod5D | Identifies a Mod/RM byte followed by 5 diplacement bytes. Calculated with the D-bit |
| *Mod5NotD | Identifies a Mod/RM byte followed by 5 diplacement bytes. Calculated with the inverted D-bit. To be used when a prefix 67h is present |
| Mod4D | Identifies a Mod/RM byte followed by 4 diplacement bytes. Calculated with the D-bit. |
| Mod4NotD | Identifies a Mod/RM byte followed by 4 diplacement bytes. Calculated with the inverted D-bit. To be used when a prefix67h is present. |
| Mod2D | Identifies a Mod/RM byte followed by 2 diplacement bytes. Calculated with the D-bit. |
| Mod2NotD | Identifies a Mod/RM byte followed by 2 diplacement bytes. Calculated with the inverted D-bit To be used when a prefix67h is present. |
| *Mod1D | Identifies a Mod/RM byte followed by 1 diplacement bytes. Calculated with the D-bit. |
| *Mod1NotD | Identifies a Mod/RM byte followed by 1 diplacement bytes. Calculated with the inverted D-bit. To be used when a prefix67h is present. |
| Mod0D | Identifies a Mod/RM byte followed by 0 diplacement bytes. Calculated with the D-bit. |

TABLE 1-continued

| SIGNAL | DESCRIPTION |
| --- | --- |
| Mod0NotD | Identifies a Mod/RM byte followed by 0 diplacement bytes. Calculated with the inverted D-bit. To be used when a prefix67h is present. |

*Identifies signals that use input from the subsequent byte.

The decode control signals 83 (i.e., 35×8 signals) of the opcode/prefix decode unit 71 provide inputs to a speculative length calculation (speculative length calculation) unit 70, which is coupled to output speculative length information to a buffer 72. Specifically, the speculative length calculation unit 70 outputs 4 (four) speculative length values for each byte of an 8-byte block, each of these speculative length values indicating the speculative length of a potential macro-instruction commencing with the relevant byte (i.e., a macro-instruction for which the relevant byte is a first byte). In other words, the speculative length calculation unit 70 assumes that each byte is a first byte, and calculates four speculative length values for instructions that are assumed to commence with the relevant byte. In one exemplary embodiment, the four (4) speculative length values for each byte are indicated in four (4) 11-bit outputs, an asserted (or high) single bit in each of the 11-bit outputs indicating a speculative length for macro-instruction commencing with the relevant byte. The requirement for four speculative length values is apparent when considering the possibility that each byte may be preceded by a length changing prefix (e.g., 66H or 67H) that may alter the default address or data size from 16 to 32 bits, or vice versa. Accordingly, the speculative length calculation unit 70 calculates the following four (4) speculative lengths values for each byte:

1. A "normal" or default length value (LENGTH[X][BYTE]) 88 that assumes that no length changing prefixes precede the relevant byte, where [X] denotes the length of an instruction expressed in the number of bits and [BYTE] denotes the byte on which the instruction having the length of [X] is assumed to start;
2. An expanded data length value (P66LENGTH[X][BYTE]) 90 that assumes a 66H length changing prefix precedes the relevant byte;
3. An expanded address length value (P67LENGTH[X][BYTE]) 92 that assumes a 67H length changing prefix precedes the relevant byte; and
4. An expanded data and address length value (BLENGTH[X][BYTE]) 94 that assumes both 66H and 67H length changing prefixes precede the relevant byte.

Figure 7:
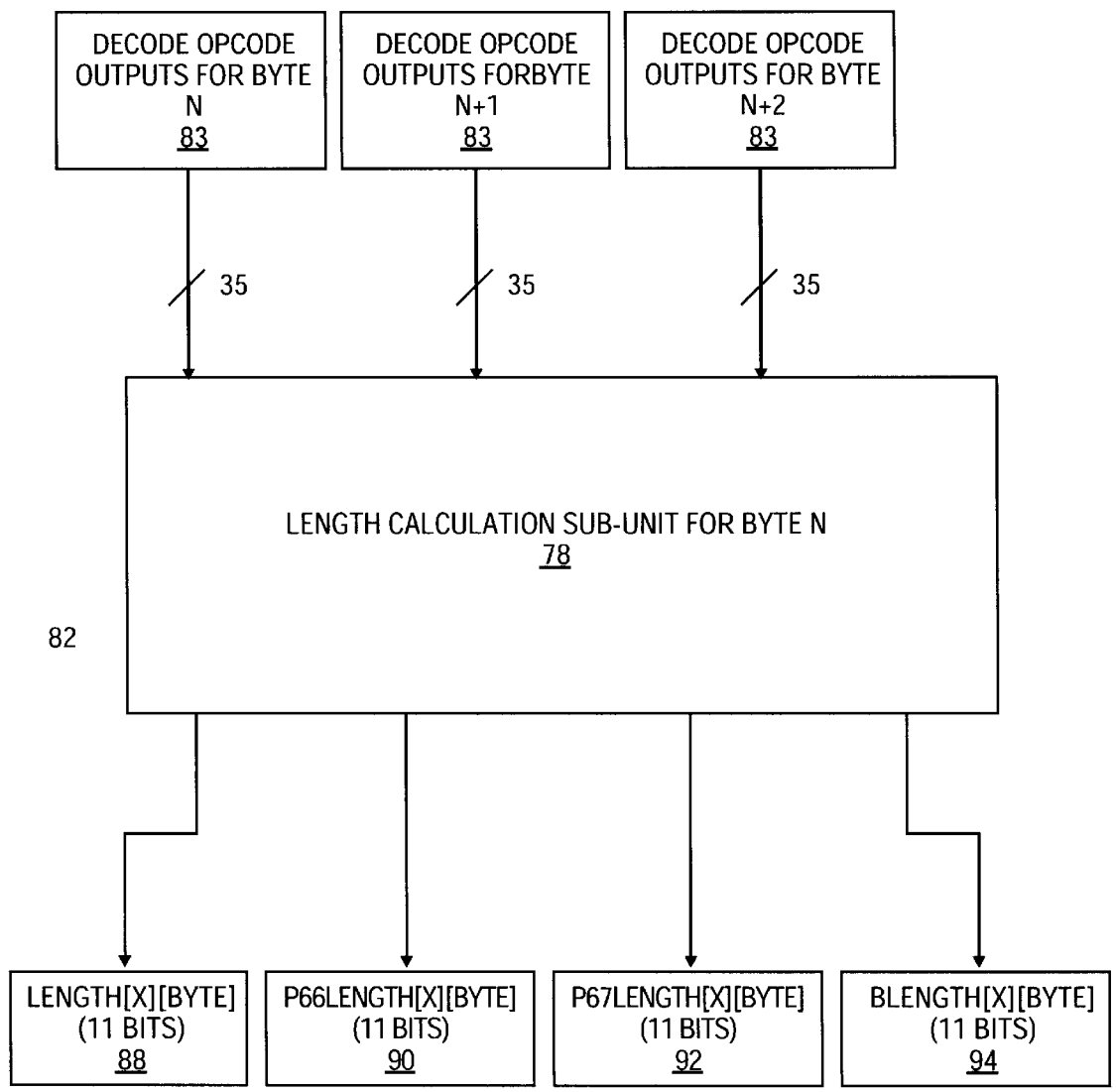
FIG. 7 is a block diagram showing architectural details of an exemplary length calculation sub-unit, according to present invention, that may be included within a speculative length calculation unit located within the instruction pre-decoder illustrated in FIG. 5.

As illustrated in further detail in FIG. 7, the speculative length calculation unit 70 includes length calculation sub-units 78 for each byte of a 8-byte block received, each length calculation sub-unit 78 calculating the speculative length values 88–94 for each of the bytes based on the assumption that the relevant byte is the first byte of an instruction (i.e., speculative length values 88–94 for macro-instructions commencing with the relevant byte). As mentioned above, the first 4-bytes of an instruction, together with any length changing prefixes, determine the length of the instruction. For this reason, each of the length calculation sub-units 78 is coupled to receive the decode control signals 83 (e.g., the 35 outputs listed above in Table 1) of a decode sub-unit 73 associated with a byte under consideration, as well as the decode control signals 83 of decode sub-units 73 associated with the two bytes subsequent to the byte under consideration. The "Nxt" and Nxt2" identifiers prepend signals 83 associated with the immediately subsequent and further subsequent byte with respect to the byte under consideration (i.e., "Nxt"=[BYTE+1] and "Nxt2"=[BYTE+2]). Accordingly, the string (Prefix 0F AND NxtOpModfollow AND Nxt2Mod0D) may be interpreted as (Prefix 0F[BYTE] AND Op2modfollow[BYTE+1] AND Mod0D[BYTE+2]). In this embodiment, each decode sub-unit 73 is accordingly shown to receive 5 bits of an immediately subsequent byte [BYTE N+1] in addition to the 8 bits of the byte [BYTE N] associated with the respective decode sub-unit 73.

In an alternative embodiment, the signals 83 for three bytes subsequent to the byte under consideration may be utilized by the sub-units 78. Table 2 sets out an exemplary set of equations by which a "normal" speculative length value 88 for an instruction assumed to commence at each byte may be calculated. The equations listed in Table 2 are performed in the exemplary embodiment with respect to each byte within an 8-byte block by a length calculation sub-unit 78 associated with the respective byte to generate "normal" speculative length value 88. Similar sets of equations are implemented in combinational logic within each of the length calculation sub-units 78 for the purposes of calculating the expanded data length value 90, the expanded address length value 92 and the expanded data and address length value 94. Specifically, to calculate the expanded data length values 90, the "Op1ModImm2" and "Op1ModImm4" variables specified within the equations listed in Table 2 may be inter-changed. Similarly, to calculate the expanded address length values 92, the "NxtModxD" variables may be substituted with the "NxtModxNOTD" variables within the equations listed in Table 2. To calculate the expanded data and address length value 94, the "Op1ModImm2" and "Op1ModImm4" variables may be inter-changed and the "NxtModxD" variables may be substituted with the "NxtModxNOTD" variables within the equations listed in Table 2. Finally, when in 16 bit mode, the "OpNoMod2" and "Op1NoMod4" variables are swapped, and when in 32 bit mode, the "OpNoMod4" and "Op1NoMod6" variables are swapped. Each of the length calculation sub-units 78 embodies standard combinational logic that implements a set of equations such as those listed in Table 2, or that implements the modified equations discussed immediately above.

TABLE 2

| SIGNAL | EQUATIONS |
| --- | --- |
| Length1 | Length1 [BYTE]: = Op1NoMod0 |
| Length2 | Length2 [BYTE]: = Op1NoMod1<br>OR (Prefix0F and NxtOp2NoMod0)<br>OR (Op1ModImm0 and NxtMod0D) |
| Length3 | Length3 [BYTE]: = Op1NoMod2<br>OR (Op1ModImm1 and NxtMod0D)<br>OR (Op1ModImm0 and NxtMod1D)<br>OR (Prefix0F and NxtOp2NoMod1)<br>OR (Prefix0F and NxtOp2ModFollow and Nxt2Mod0D) |
| Length4 | Length4 [BYTE]: = Op1NoMod3<br>OR (Op1ModImm2 and NxtMod0D)<br>OR (Op1ModImm1 and NxtMod1D)<br>OR (Op1ModImm0 and NxtMod2D)<br>OR (Prefix0F and NxtOp2NoMod2)<br>OR (Prefix0F and NxtOp2ModFollow and Nxt2Mod1D)<br>OR (Prefix0F and NxtOp2ModImm1 And Nxt2Mod0D) |
| Length5 | Length5 [BYTE]: = Op1NoMod4<br>OR (Op1ModImm2 and NxtMod1D)<br>OR (Op1ModImm1 and NxtMod2D)<br>OR (Prefix0F and NxtOp2ModFollow and |

TABLE 2-continued

| SIGNAL | EQUATIONS |
|---|---|
| | Nxt2Mod2D) |
| | OR (Prefix0F and NxtOp2ModImm1 and |
| | Nxt2Mod1D) |
| Length6 | Length6 [BYTE]: = (Op1ModImm4 and NxtMod0D) |
| | OR (Op1ModImm2 and NxtMod2D) |
| | OR (Op1ModImm0 and NxtMod4D) |
| | OR (Prefix0F and NxtOp2NoMod4) |
| | OR (Prefix0F and NxtOp2ModImm1 and |
| | Nxt2Mod2D) |
| Length7 | Length7 [BYTE]: = Op1NoMod6 |
| | OR (Op1ModImm4 and NxtMod1D) |
| | OR (Op1ModImm1 and NxtMod4D) |
| | OR (Op1ModImm0 and NxtMod5D) |
| | OR (Prefix0F and NxtOp2ModFollow and |
| | Nxt2Mod4D) |
| Length8 | Length8 [BYTE]: = (Op1ModImm4 and NxtMod2D) |
| | OR (Op1ModImm2 and NxtMod4D) |
| | OR (Op1ModImm1 and NxtMod5D) |
| | OR (Prefix0F and NxtOp2ModImm1 and |
| | Nxt2Mod4D) |
| | OR (Prefix0F and NxtOp2ModFollow |
| | And Nxt2Mod5D) |
| Length9 | Length9 [BYTE]: = (Op1ModImm2 and NxtMod5d) |
| | OR (Prefix0F and NxtOp2ModImm1 and |
| | Nxt2Mod5D) |
| Length10 | Length10 [BYTE]: = (Op1ModImm4 and NxtMod4D) |
| Length11 | Length11 [BYTE]: = (Op1ModImm4 and NxtMod5D) |

The generation of the four (4) speculative length values 88–94 for each of the eight bytes supplied to the speculative length calculation unit 70 occurs in parallel. It will further be appreciated that more than eight bytes of instruction code may be processed in parallel, and that a corresponding number of length calculation sub-units 78 could accordingly be provided within the speculative length calculation unit 70. For example, the teachings of the present invention could readily be expanded to cover architectures in which speculative length values for 16 or even 32 bytes are generated in parallel.

Returning to FIG. 5, the speculative length information and the decode control signals 83 for each of the eight bytes are buffered within the buffer 72 before being propagated to a N/M way marking unit 74 (where N is the number of input bytes and M is the number of bytes handled by each making logic unit (or way) within the marking unit 74) that, according to one embodiment of the present invention, generates byte-marking vectors. In the illustrated embodiment, the marking unit 74 comprises a 2-way (i.e., 8/4 way) marking unit, and is shown to comprise lower 4-byte marking logic 100, upper 4-byte marking logic 102, overflow logic 101 and wrap logic 103, the structure and function of which will be described in further detail below. As illustrated, the overflow logic 101 is coupled to provide input (i.e., an overflow pointer signal 135) to the upper 4-byte marking logic 102, and the wrap logic 103 is coupled to provide input (i.e., a wrap pointer signal 133) to the lower 4-byte marking logic 100.

Byte marking vectors are dispatched from the marking unit 74 to the instruction steering unit 58 that rotates and aligns the macro-instruction code for decoding by the instruction translator (IT) unit 60. Specifically, the instruction steering unit 58 makes an assumption that bytes that fall between last and first byte markings are prefixes. The unit 58 is thus able to strip out prefixes from the instruction stream for separate processing.

The N/M Way Marking Unit

The generation of a byte marking vector (also termed a boundary marking vector), such as that illustrated at 64 in FIG. 4, comprises three basic steps, namely:

1. Identifying a byte that comprises either a first byte of a current instruction, or the last byte of an instruction preceding the current instruction in the instruction stream;
2. Determining of the length of the current instruction; and
3. Adding the length of the current instruction to the last byte of the preceding instruction so that the first byte of the next instruction can be identified in the next iteration or cycle.

Accordingly, it would appear that the above steps (1), (2), and (3) are inherently serial in nature. Specifically, step (1) is dependent on the outcome of step (3) in a previous iteration (or cycle), and step (3) is dependent on the calculated length of the current instruction. From a high-level perspective, the present invention seeks to introduce a degree of parallelism into the generation of the byte marking vector by (a) making various assumptions that allow certain calculations to be performed in parallel, and then (b) selecting the correct result from among the results generated by the parallel calculations.

The present invention proposes dividing the instruction stream into blocks including a predetermined number of bytes. In one embodiment of the invention, the instruction stream is divided into blocks of four (4) bytes. With respect to each block, an assumption is made that each byte within the block is a first (or START) byte of an instruction. Specifically, in one embodiment, the present invention proposes dividing the instruction stream into blocks of 4-bytes, each block being regarded as isolated from preceding blocks (i.e., temporarily ignoring where an instruction begins in a preceding block ends). Each byte within the block is then considered as being a potential first (or START) byte of an instruction. Based on these assumptions, the location of potential byte markers for the remaining bytes within the subject block can be speculatively calculated in parallel and in advance of actual knowledge regarding the location (or lack of) a START byte within the subject block, utilizing the speculative length information generated by the speculative length calculation unit 70. As soon as the correct END byte of a preceding instruction to be marked is known, or the START byte of the next instruction to be marked is know, the correct and precalculated pairs of marking bits to be included within the byte marking vector can be selected. For example, the information shown below in Table 3 may be precalculated, each row representing a precalculated outcome based on the assumption that a byte within a block is a first byte, and the correct row then selected to provide a desired set of byte marking pairs.

TABLE 3

| Condition/Assumption | BYTE 0 | BYTE 1 | BYTE 2 | BYTE 3 |
|---|---|---|---|---|
| Byte 0 = first byte of instruction | 1 (start mark) 0 | 01 (end mark) | 00 | 11 |
| Byte 1 = first byte of instruction | 01 | 10 | 01 | 00 |
| Byte 2 = first byte of instruction | 00 | 01 | 11 | 11 |
| Byte 3 = first byte of instruction | 00 | 00 | 01 | 10 |
| Byte 3 = last byte of instruction | 00 | 00 | 00 | 01 |
| No start or end bytes in current block | 00 | 00 | 00 | 00 |

Figure 8:
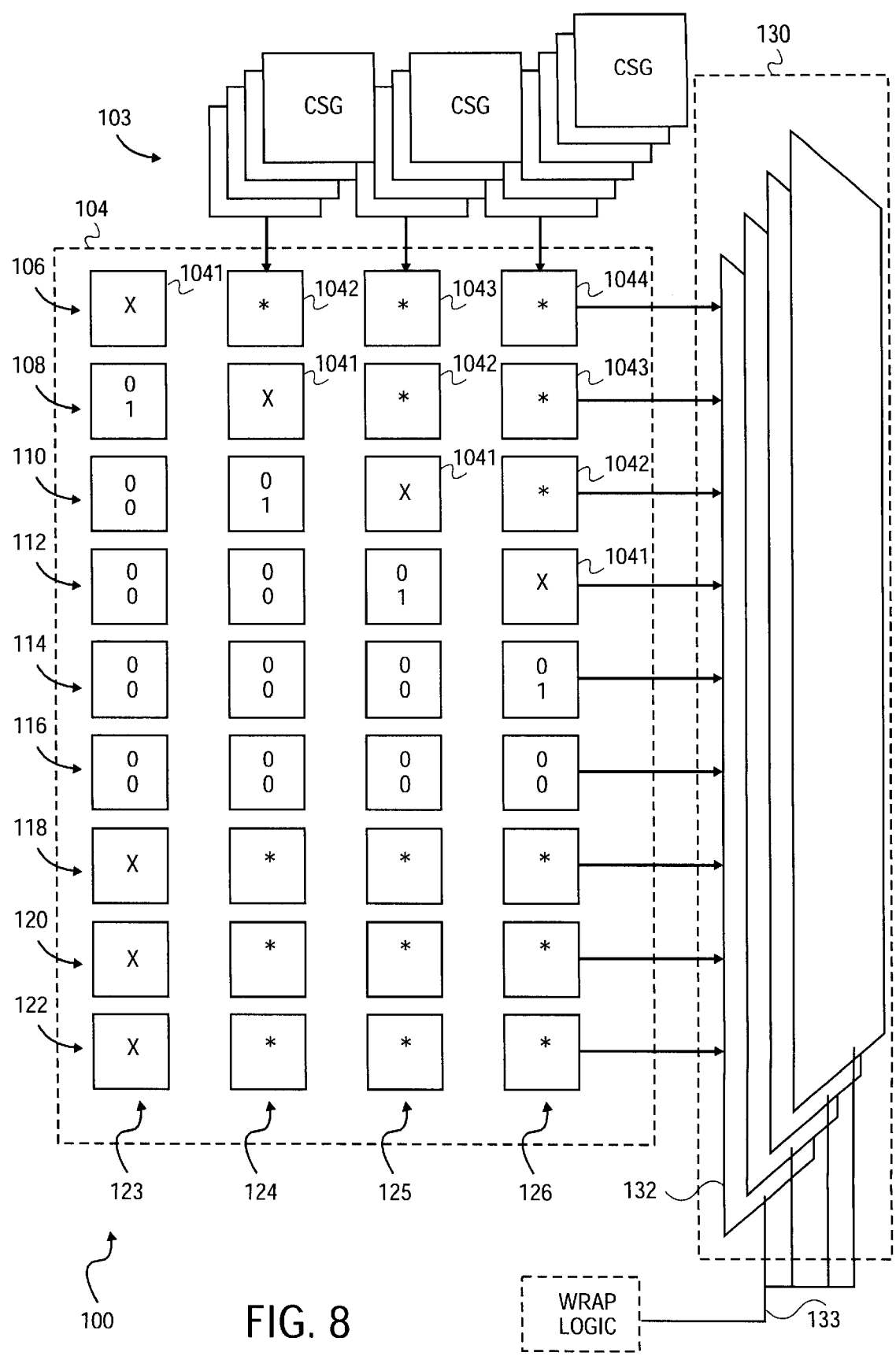
FIG. 8 is a block diagram providing a conceptual representation of byte-marking logic, according to exemplary embodiment of the present invention.

FIG. 8 is a block diagram providing a conceptual representation of the lower 4-byte marking logic 100, according to one exemplary embodiment of the invention, which implements the above described concept. A detailed description of the lower 4-byte marking logic 100 is provided below. While the upper and lower 4-byte marking logics 100 and 102 operate on inputs associated with the first and second 4-byte blocks of a 8-byte block, the structure and functioning of the upper 4-byte marking logic 102 is substantially identical to that of the lower 4-byte marking logic 100. The below description of the lower 4-byte marking logic 100 is accordingly also descriptive of the upper 4-byte marking logic 102.

The lower 4-byte marking logic 100 is shown to include 15 control signal generators 103 that provide output in the form of control signals to columns of an array of byte marking sub-units 104. While the byte marking sub-units 104 may not actually be implemented in an array as illustrated in a FIG. 8, it is useful to represent the byte marking sub-units 104 as such to provide an understanding of the present invention. The byte marking sub-units 104 in turn each output a bit pair (i.e., marking bits) that comprise potential corresponding bits for inclusion a START byte marking vector 66 and an END byte marking vector 68 (e.g., such as the byte marking pairs illustrated in Table 1). Specifically, each row of byte marking sub-units 104 outputs 4 bit pairs that collectively represent four corresponding entries of START and END byte marking vectors should an assumption associated with the relevant row of byte marking sub-units 104 be correct.

A selection of the outputs of a particular row of byte marking sub-units 104 as true and correct is made by a selection logic 130 is the exemplary form of a multiplexer arrangement. The multiplexer arrangement includes four 9-to-1 multiplexers, each multiplexer being associated with one column of the array of byte marking sub-units 104 and coupled to receive the bit pairs outputted by of the sub-units 104 within the associated column as input. Each of the multiplexers then selects a bit pair outputted by any one of the sub-units 104 in the associated column as output. For example, the multiplexer 132 is coupled to select the output of any one of the byte marking sub-units 104 included within the right-hand side column 126 of the array.

Turning specifically to each row within the array, row 106 outputs byte markings pairs that are correct if it transpires that the first byte of a block of 4-bytes (for which speculative lengths were calculated) is in fact the first byte of an instruction. Similarly, row 108 outputs byte markings pairs that are correct if it transpires that the second byte of an associated block of 4-bytes is the first byte of an instruction, row 110 outputs byte markings pairs that are correct if it transpires that the third byte of an associated block of 4-bytes is the first byte of an instruction, and row 112 outputs byte markings pairs that are correct if it transpires that the fourth byte of an associated block of 4-bytes is the first byte of an instruction. Row 114 outputs byte markings pairs that are correct if it transpires that fourth byte of a relevant block of 4-bytes is the last byte of an instruction, and row 116 byte markings pairs that are correct if it transpires that no bytes within a relevant block of 4-bytes are start or end bytes.

Rows 118–122 output byte marking pairs that are correct if a length changing prefix is encountered that has the effect of changing the data or address length of an instruction. Specifically, row 118 outputs for 4-byte marking pairs that are speculatively calculated based on the assumption that a data length changing prefix 66H is encountered, row 120 outputs 4 byte marking pairs that are speculatively calculated based on the assumption that an address length changing prefix 67H is encountered, and row 122 outputs 4 byte marking pairs that are speculatively calculated based on the assumption that both data and address length changing prefixes 66H and 67H are encountered. The need for the rows 118–122 becomes apparent when considering that, as the length changing prefixes 66H and 67H are "sticky" (i.e., the effect of the prefixes is sustained until a further prefix is encountered in instruction stream), the length changing effect of a prefix encountered in a previous 8-byte block may be carried forward to a 8-byte block being processed by the marking unit 74. In the absence of the rows 118–122, a bottleneck would be introduced in that it would not be possible to generate the byte marking vectors until the correct length for byte 0 was known. The rows 118–122 generate byte marking vectors based on the assumption that 66H, 67H, and both 66H and 67H prefixes were respectively encountered.

As mentioned above, it is conceptually convenient to view the byte marking sub-units 104 as an array. However, a number of the byte marking sub-units 104 illustrated in FIG. 8 may represent "don't care" situations, or may represent fixed outputs that are independent of the speculative length calculations performed by the speculative length calculation unit 70. To this end, the "sub-units" 104 that are shown in FIG. 8 to include bit pairs comprise fixed outputs that are not affected by the speculative length calculations. Similarly, the "sub-units" 104 that are marked with a "X" represent "don't care" conditions because such sub-units represent the assumed start byte of an instruction. The byte marking sub-units 104 marked with a "*" represent "active" sub-units 104 that include combinational logic for generating speculative bit pairs based on the speculative length calculations and decode control signals 83. Further details regarding an exemplary embodiment of the byte marking sub-units 104 that include such combinational logic are provided below.

Control Signal Generators

The exemplary 4-byte marking logic 100 as shown in FIG. 8 includes a total of 15 controller signal generators 103 that provide input to the array of byte marking sub-units 104. In order to appreciate the functionality of the sub-units 104, it is firstly necessary to examine the generation of the control signals by the control signal generators 103 that provide input to the sub-units 104. FIG. 8 further illustrates that a total of four controller signal generators 103 provide input to the column 124 of the array, four control signal generators that provide input to the column 125 of the array, and six control signal generators 103 provide input to the column 126 of the array. Specifically, each of the control signal generators 103 provides a total of five control signals to each of the "active" byte marking sub-units 104 (i.e., the sub-units 104 marked with an "*"). Accordingly, column 123 of the array has no sub-units 104 that have speculative length dependent outputs, whereas the column 124 has three sub-units 104 whose output is speculative length dependent.

Figure 9:
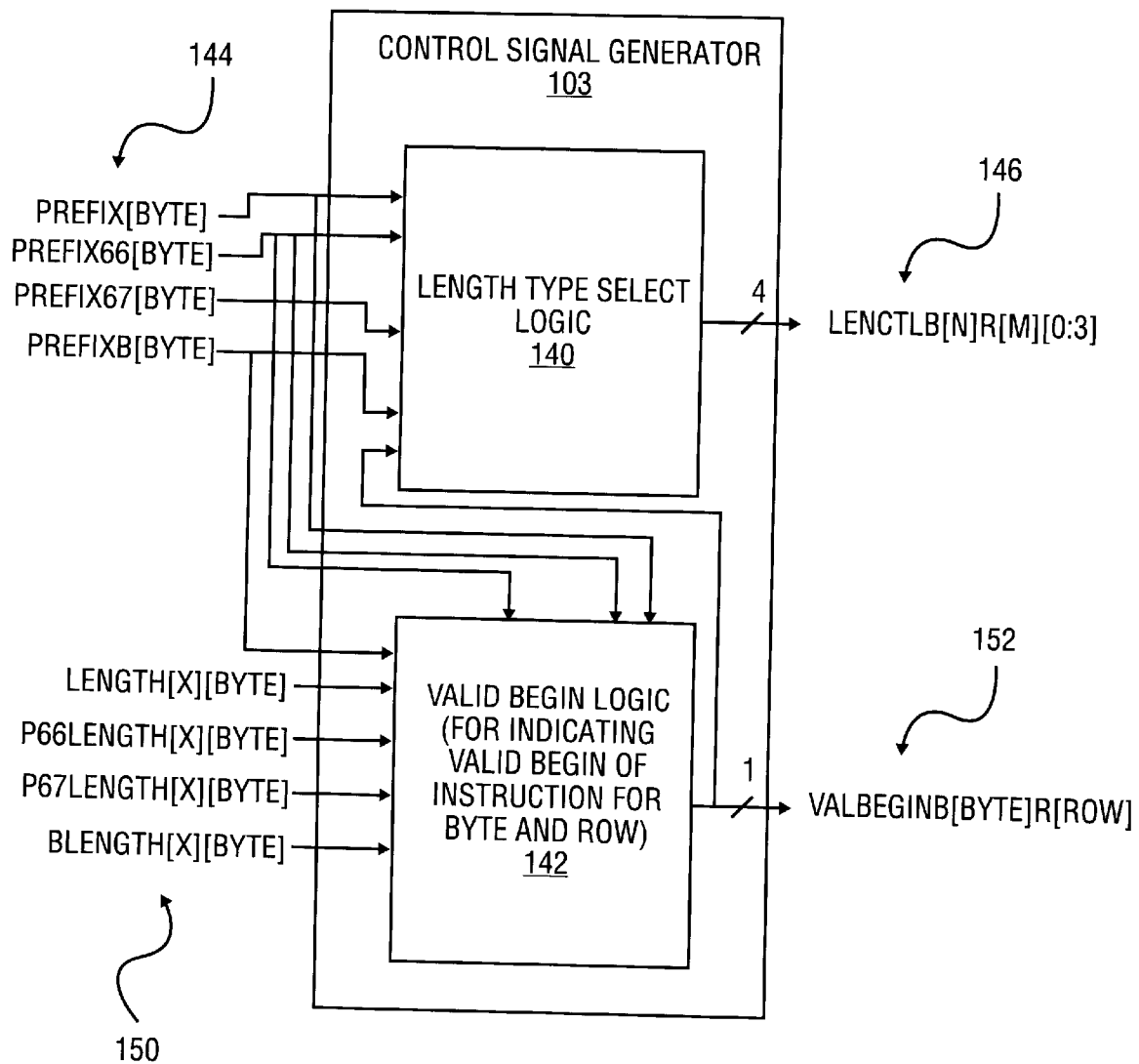
FIG. 9 is a block diagram showing the architectural details of a control signal generator, according to exemplary embodiment of the present invention, that provides control signal input to the byte-marking logic shown in FIG. 8.

FIG. 9 is a block diagram illustrating the architectural details of the exemplary control signal generator 103. The control signal generator 103 is shown to include length type select logic 140 and valid begin logic 142. Turning first to the length type select logic 140, the logic 140 is shown to receive four (4) prefix signals 144, namely PREFIX [BYTE], PREFIX66[BYTE], PREFIX67 [BYTE], and PREFIXB [BYTE], these signals comprising decode control signals 83 listed in Table 1 and being outputted by a decoded sub-unit 73 that decode the same byte for which the respective control signal generator 103 provides control signals. For example, one of the four control signal generators 103 that provides control signals to the second column 124 of the array would receive prefix signals 144 from a decode sub-unit 73 that decoded the second byte of eight bytes decoded in parallel by the opcode/prefix decode unit 701. Utilizing the prefix signals 144, the length type selection logic 140 outputs four (4) length control signals 146 (i.e., LENCTLB [N] R [10] [0:3]) that indicate the speculative length type that the lower 4-byte marking logic 100 should utilize. The lower 4-byte marking logic 100 references this signal in a vector encoded manner. For example, the control signal generator 103 that generates control signals for the byte marking sub-unit 104 for byte 3, row 1 may provide the following vector encoded output:

1. LENCTLB 3 R 1 [0] if asserted indicates that the relevant sub-unit 104 should assume a "normal" length instruction;
2. LENCTLB 3 R 1 [1] if asserted indicates that the relevant sub-unit 104 should assume an expanded data length instruction (i.e., a "prefix66" length);
3. LENCTLB 3 R 1 [2] if asserted indicates that the relevant sub-unit 104 should assume an expanded address length instruction (i.e., a "prefix67" length); and
4. LENCTLB 3 R 1 [3] if asserted indicates that the relevant sub-unit 104 should assume an expanded data and address length instruction (i.e., a "prefix66" and "prefix67" length).

It should be noted that one, and only one, of the above vectors may be active (or asserted) at any one time.

Turning now to the valid begin logic 142, the logic 142 is shown to receive the prefix signals 144 and length values 150 as inputs, and to output a valid begin signal (VALBEGINB[BYTE]R[ROW TO]) 152 that indicates whether a respective byte position (i.e., the byte position associated with the column of the array to which the control generator 103 provides input) could potentially be the beginning of a new instruction. Specifically, the valid begin logic 142 is coupled to receive the prefix signals 144 from the opcode/prefix decode unit 71, as well as at least 4 length values 150 from the speculative length calculation unit 70, namely the LENGTH [X] [BYTE], P66 LENGTH [X] [BYTE], P67 LENGTH [X] [BYTE], and BLENGTH [X] [BYTE] signals 88–92. The valid begin logic 142 within each of the control signal generators 103 includes combinational logic that results in the valid begin signal 152 outputted from the control signal generator being asserted if the relevant byte position could be the beginning of a valid instruction. Tables 4, 5 and 6 below set out the statements that may be implemented in combinational logic within each of the control signal generators 103 to assert or de-asset a valid begin signal 152 outputted therefrom.

Figure 10:
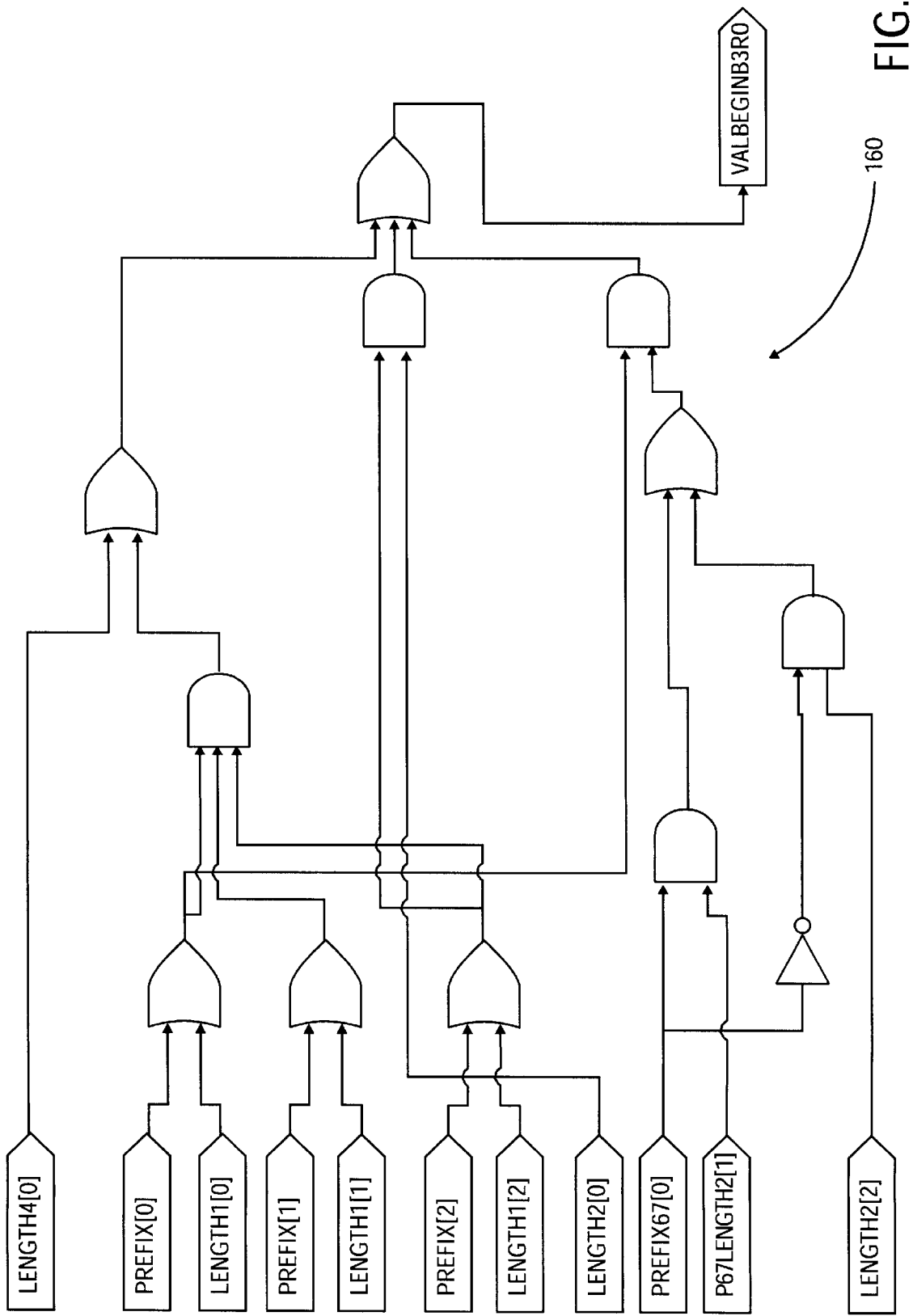
FIG. 10 is a schematic diagram illustrating combinational logic, according to exemplary embodiment of the present invention, which may be implemented within the control signal generator shown in FIG. 9 as "valid begin logic" for outputting a valid begin signal to the byte-marking logic.

FIG. 10 is a schematic diagram illustrating combinational logic 160, according to an exemplary embodiment of the present invention, which may be implemented within a control signal generator 103 as the valid begin logic 142 for outputting a valid begin signal 152 for the byte marking sub-unit 104 for byte 3 (i.e., column 125), row 1. Similarly, the statements given above in Tables 4, 5 and 6 may be implemented in combinational logic, utilizing teachings well-known to those skilled in the art, to generate valid begin signals 152 for the control signal generators 103 illustrated in a FIG. 8.

Figure 11A:
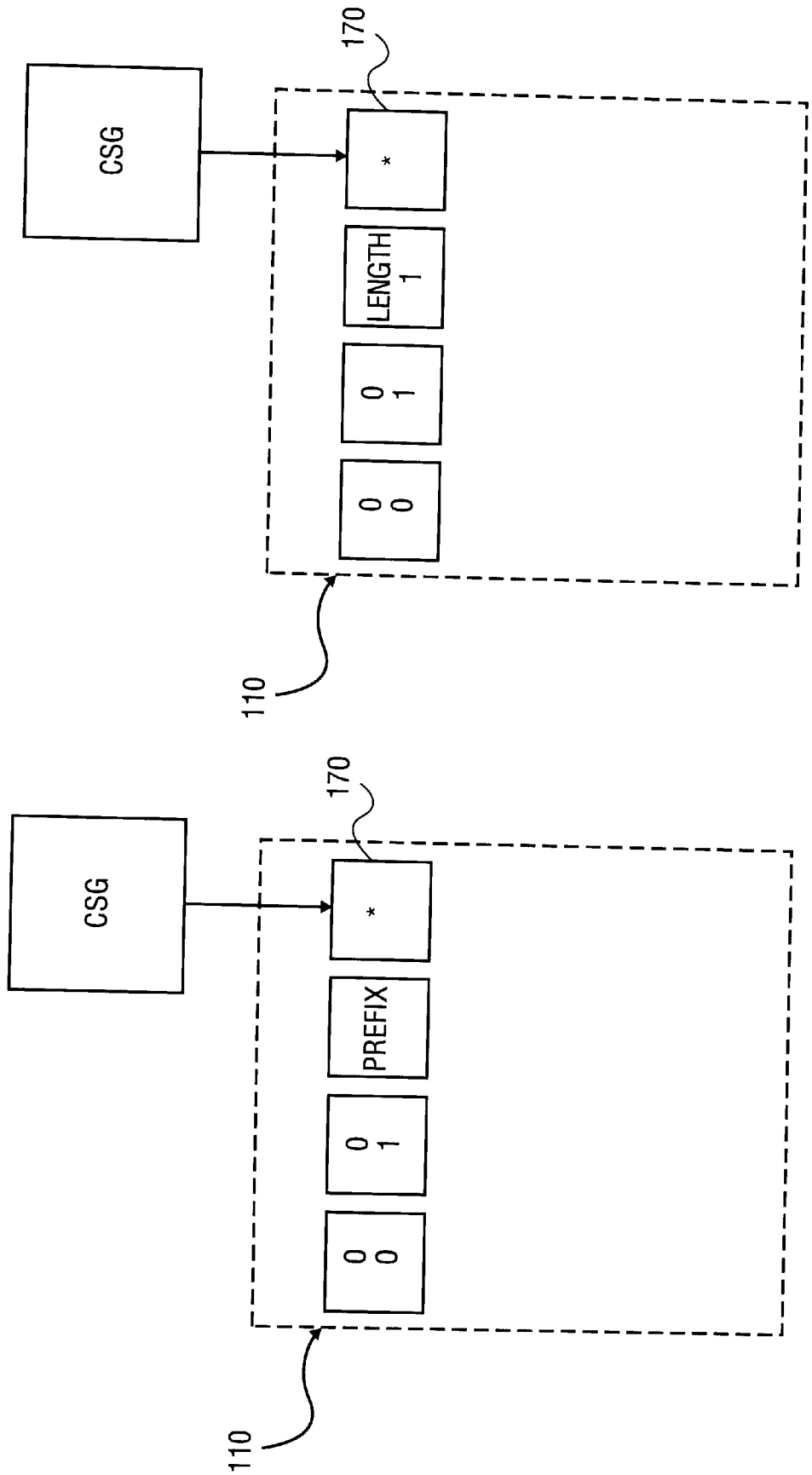
FIGS. 11A and 11B are diagrammatic illustrations of exemplary interactions between the "valid begin logic" and the byte-marking logic.

Both exemplary simple and complex cases handled by the valid begin logic 142 will now briefly be described with reference to FIGS. 11A and 11B. FIG. 11A shows only the third row 110 of the array of byte marking sub-units 104, the third row 110 corresponding to the assumption that the second byte of a 4-byte block is the end of an instruction. In this situation, the combinational logic that comprises the valid begin logic 142 within a control signal generator 103 that provides input into the byte marking sub-unit 170 will only asserted the appropriate valid begin signal 152 (i.e., VALBEGINB3R2) if one of two conditions are met, namely (1) if the third byte (i.e., byte 2) is a one byte instruction or (2) if the third byte is a prefix byte. These two situations are illustrated in FIG. 11A. The values of the four length control signals 146 would potentially be as follows:

TABLE 4

1. LENCTLB 3 R 2 [0] would be asserted if no potential 66 prefix or 67 prefix constituted the third byte (i.e., byte 2);
2. LENCTLB 3 R 2 [1] would be asserted if a potential 66 prefix constituted the third byte;
3. LENCTLB 3 R 2 [2] would be asserted if a potential 67 prefix constituted the third byte; and
4. LENCTLB 3 R 2 [3] would never be asserted as a 66 prefix or a 67 prefix cannot both precede the 4-byte (i.e., byte 3).

Figure 11B:
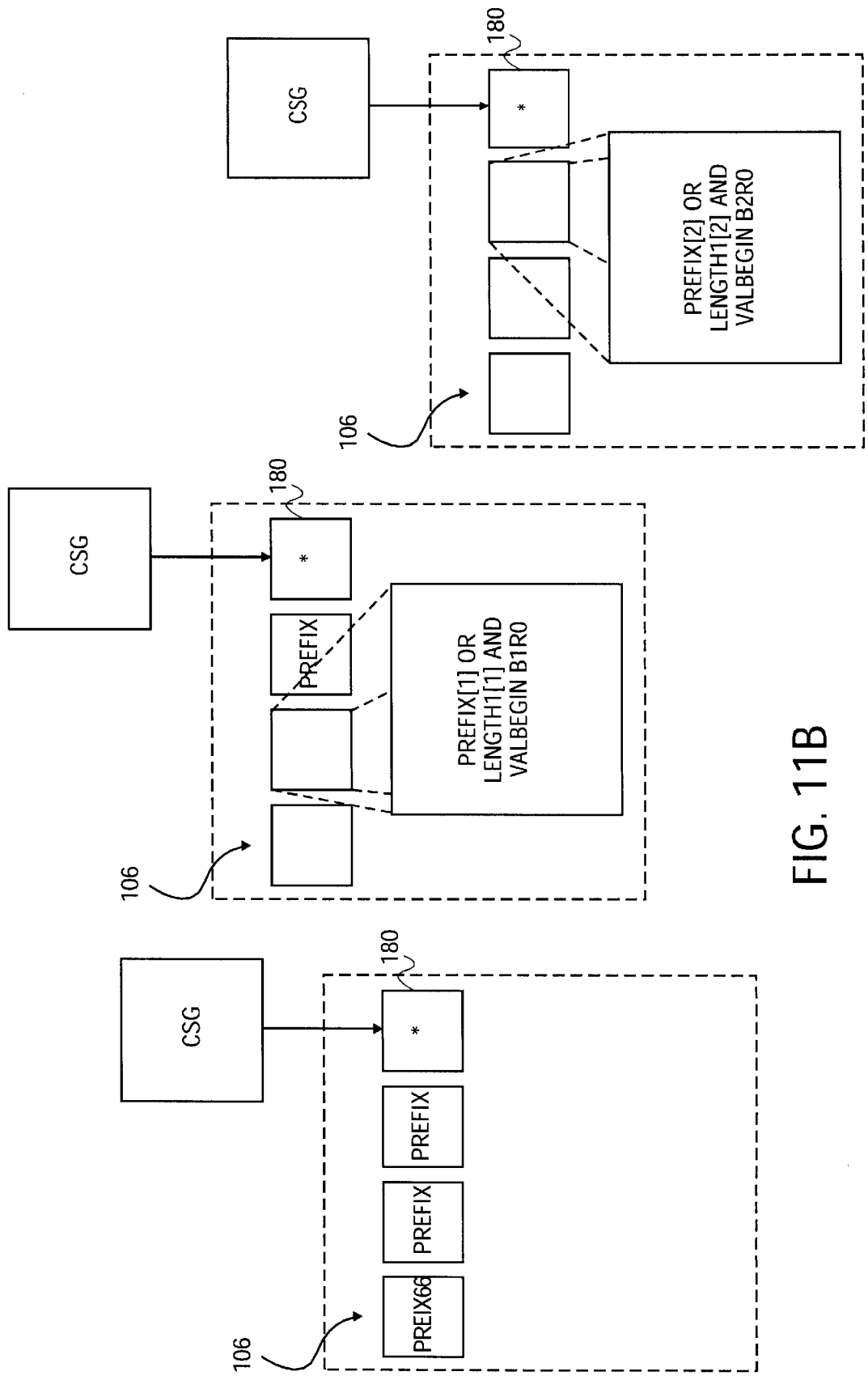

FIG. 11B shows only the first row 106 of the array of byte marking sub-units 104, the first row corresponding to the assumption that any byte can be a valid beginning (or start) of instruction. In this situation, the combinational logic that comprises the valid begin logic 142 within a control signal generator 103 that provides input into the byte marking sub-unit 180 of the first row, fourth byte (or column) will only assert the appropriate valid begin signal 152 (i.e., VALBEGINB3R0) if one of the following conditions are met, namely:

TABLE 5

(1) if the first byte (i.e., byte 0) is a one byte instruction OR is a prefix, AND the second byte (i.e., byte one) is a two byte instruction; OR
(2) if the first byte is a two byte instruction, AND the third byte is a one byte instruction OR a prefix; OR
(3) if the first byte is a one byte instruction OR a prefix, AND the second byte (i.e., byte 1) is a one byte instruction OR a prefix, AND the second byte is a one byte instruction OR a prefix.

These three situations are illustrated in FIG. 11B. The values of the four length control signals 146 would potentially be as follows:

TABLE 6

1. LENCTLB 3 R 0 [0] would be asserted if no potential 66 prefix or 67 prefix constituted the first to third byte (i.e., byte 0–2);
2. LENCTLB 3 R 0 [1] would be asserted if a 66 prefix constituted (2.1) the first byte OR (2.2) the second byte and a valid begin signal 156 for the second byte (i.e., VALBEGINB2R0) was asserted OR (2.3) the third byte (i.e., bytes 2) and a valid begin signal 156 (i.e., VALBEGINB2R0) was asserted;
3. LENCTLB 3 R 0 [2] would be asserted if a 67H prefix constituted (3.1) the first byte OR (3.2) the second byte and a valid begin signal 156 for the second byte (i.e., VALBEGINB2R0) was asserted OR (3.3) the third byte (i.e., bytes 2) and a valid begin signal 156 (i.e., VALBEGINB2R0) was asserted; and
4. LENCTLB 3 R 0 [3] would be asserted if a 66H prefix constituted (4.1.1) the first byte OR (4.1.2) the second byte and a valid begin signal 156 for the second byte (i.e., VALBEGINB2RO) 0was asserted OR (4.1.3) the third byte (i.e., bytes 2) and a valid begin signal 156 (i.e., VALBEGINB2R0) was asserted AND if a 67 prefix constituted (4.2.1) the first byte OR (4.2.2) the second byte and a valid begin signal 156 for the second byte (i.e., VALBEGINB2R0) was asserted OR (4.2.3) the third byte (i.e., bytes 2) and a valid begin signal 156 (i.e., VALBEGINB2R0) was asserted.

The Byte Marking Sub-Units

Referring again to FIG. 8, and as discussed above, each of the byte marking sub-units 104 within the array of the lower 4-byte marking logic 100 may conceptually be classified as providing a "don't care" output, a fixed output, or a speculative length dependent ("active") output. Each byte marking sub-unit 104 that produces a speculative length dependent output is identified by a respective "*" in FIG. 8, and shall for the purposes of the present specification be referred to as an "active" byte marking sub-unit 104. Each active byte marking sub-unit 104 has a respective control signal generator 103 associated therewith that provides control signals, namely a 1-bit valid begin signal 152 and four 1-bit length control signals 146, to the relevant byte marking sub-unit 104. In addition to receiving the control signals from the associated control signal generator 103, each of the active byte marking sub-units 104 is coupled to receive speculative instruction length information for an appropriate byte in the form of the speculative length values 88, 90, 92 and 94 from a length calculation sub-unit 78 for the appropriate byte. The control signals 152 and 156 are utilized in conjunction with the speculative length values 88, 90, 92 and 94 by the active byte marking sub-units 104 to generate outputs, such as those illustrated above in Table 1. Specifically, each of the "active" byte marking sub-units may output a first bit output (OpMrkRow[ROW]Col[BYTE])to be incorporated within a START byte vector 66 and a second bit output (EndMrkRow[ROW]Col[BYTE]) to be incorporated within the END byte marking vector 68.

The following equations express values for the first and the second the outputs of each of the active byte markings sub-units in terms of logic functions pertaining to the control signals 152 and 156, the speculative length values 88–94 and true length value inputs 216 that are discussed below with reference to FIG. 12C. The provided equations may be implemented in combinational logic within the indicated active byte marking sub units.

TABLE 7

EQUATION SET 1: These equations are implemented within each of the byte marking sub-units 1041.
ASSUMPTION: The current byte position is a valid beginning of an instruction.
START CONDITION: If it not a prefix then it is the beginning of an opcode.
OpMrkRow[ROW]Col[BYTE] := NOT Prefix[BYTE].
END CONDITION: If the Length is 1 then it is the end of the instruction.
EndMrkRow[ROW]Col[BYTE] := Length1[BYTE];

TABLE 8

EQUATION SET 2: These equations are implemented within each of the byte marking sub-units 1042.
ASSUMPTION: The previous instruction is valid.
START CONDITION: If there was no Prefix0f detected in the byte 0, mark the opcode mark as a 0.
OpMrkRow[ROW]Col[BYTE] := Prefix0F[BYTE−1] OR (alBeginb[BYTE]r[ROW] AND NOT Prefix[BYTE]).
END CONDITION: If the length of the instruction in byte0 was 2, then mark the end byte as 1 else mark it as a 0.
EndMrkRow[ROW]Col[BYTE] := True[ROW]Len2[BYTE−1] OR (ValBeginb[BYTE]r[ROW] AND Length1[BYTE].

TABLE 9

EQUATION SET 3: These equations are implemented within each of the byte marking sub-units 1043.
ASSUMPTION: The valid beginning of an instruction is two bytes before the current byte position.
START CONDITION: Assumed that the byte 2 before the current

TABLE 9-continued boat was valid therefore the Opmark has to be zero.
OpMrkRow[ROW]Col[BYTE] := (ValBeginb[BYTE]r[ROW] AND Prefix0F[BYTE−1]) OR
 (ValBeginb[BYTE]r[ROW]AND
 NOT Prefix[BYTE]);
END CONDITION: The current byte will be an end byte if the valid byte length is 3
EndMrkRow[ROW]Col[BYTE] := True[BYTE]Len2[BYTE−1] OR
 (ValBeginb [BYTE]r[ROW] AND
 Length1[BYTE]) OR
 True[ROW]Len3 [BYTE−2];

TABLE 10

EQUATION SET 4: This equation is implemented within each of the byte marking sub-units 1044.
ASSUMPTION: The valid beginning of an instruction is 3 bytes before the current byte position examined by the relevant byte marking sub-unit.
START CONDITION: Assumed that the byte 3 before the current byte was valid therefore the Opmark mark has to be zero.
OpMrkRow[ROW]Col[BYTE] : = (ValBeginb[BYTE]r[ROW]AND Prefix0F[BYTE−1]) OR
 (ValBeginb[BYTE]r[ROW] AND
 NOT Prefix[BYTE])
END CONDITION: The current BYTE will be an end byte if the valid byte length is 4.
EndMrkRow[ROW]Col[BYTE] := True[ROW]Len2[BYTE−1] OR
 (ValBeginb[BYTE]r[ROW] AND
 Length1[BYTE]) OR
 True[ROW]Len3[BYTE−2] OR
 True[ROW]Len4[BYTE−3];

The true length values 216 used in the last two equations indicate the need to choose the appropriate length based on the presence of a prefix in earlier bytes (indicated by the lenctlb[BYTE]r[ROW] logic signals)

Wrap and Overflow Logic

Row selection logic 130 in the form of the collection of multiplexers within the lower 4-byte marking logic 100 serves to select the outputs of a row of byte marking sub-units 104 within the array as valid. The multiplexers select a row of the array as being valid based on a wrap pointer signal 133 generated by the wrap logic 103 or a CLIP 137. Similarly, the upper 4-byte marking logic 102 includes selection logic 130 that selects a row of an array as being valid based on an overflow pointer signal 135. A detailed description is provided below regarding the overflow logic 101, and the generation of the overflow pointer signal 135. Again, the overflow logic 101 is substantially identical to the wrap logic 103, and the generation of the wrap pointer signal 133 is generated in substantially the same way as the overflow pointer signal 135. A wrap logic 103 may however differ from the overflow logic 101 in that it must keep track of two cycle loops when the input stream size (e.g., an 8-byte block) is smaller than the maximum length of an instruction (e.g., 11 bytes), as the case with the described exemplary embodiment.

Dealing with the overflow issue on a conceptual level, an assumption can firstly be made that a wrap pointer signal 133, selecting one of the nine rows comprising the array of byte marking sub-units 104, is known. This wrap pointer signal 133 may be generated as a result of a wrap occurring from the upper 4-byte marking logic 102, or may be generated utilizing a Current Linear Instruction Pointer (CLIP) during initial execution of a set of instructions for which the 8-byte block under consideration of comprises the first eight bytes of the instruction stream. Conceptually, the following three items of information are required to generate the overflow pointer signal 135:

1. The row that was selected as valid within the lower 4-byte marking logic 100;
2. The byte that comprise the beginning of the last valid instruction commenced within the selected row; and
3. The length of the last valid instruction that commenced within the selected row.

Utilizing the above identified three items of information, the overflow pointer signal 135 can be generated to select an appropriate row within the upper 4-byte marking logic 102, and to thereby generated valid START and END byte marking vectors therefrom. As mentioned above, item (1) is known as a result of a previously generated wrap pointer signal 133, or from the CLIP. Item (2), namely the byte that comprise the beginning of the last instruction, may be calculated from the valid begin signals 152 generated for the respective bytes within the selected row. For example, if byte 3 was identified as a valid beginning, then it would necessarily be the last valid instruction. Similarly, byte 2 would be the beginning of instruction if the valid begin signal 152 for byte 2 was asserted, and the valid control begin signal 152 for byte 4 was not asserted. Accordingly, based on the valid begin signals 152 for the 4-bytes within each row, it is possible to calculate the last byte that could comprise the beginning of valid instruction within the relevant row. Furthermore, this calculation may be performed immediately proceeding the generation of the relevant valid begin signals 152, and in parallel with the speculative byte marking operations performed by the byte marking sub-units 104. Regarding item (3), namely the length of the last valid instruction that commenced within the selected row, the length instruction speculative length values 88–92 are calculated for each byte position by the speculative length calculation unit 70. Accordingly, the correct and valid speculative length values 88–92 for the byte identified as comprising the beginning of the last valid instruction must be selected.

The calculation of a value for the overflow pointer signal 135 can accordingly be calculated according to the following equation (EQUATION 1):

> Overflow pointer value (i.e., row index in upper 4-byte marking logic 102)=<byte position of last valid instruction (i.e., item (2))>+<length of last valid instruction (i.e., item (3))>−<the number of bytes serviced by the upper 4-byte marking logic 102 (e.g., 4-bytes)>.

Figure 12A:
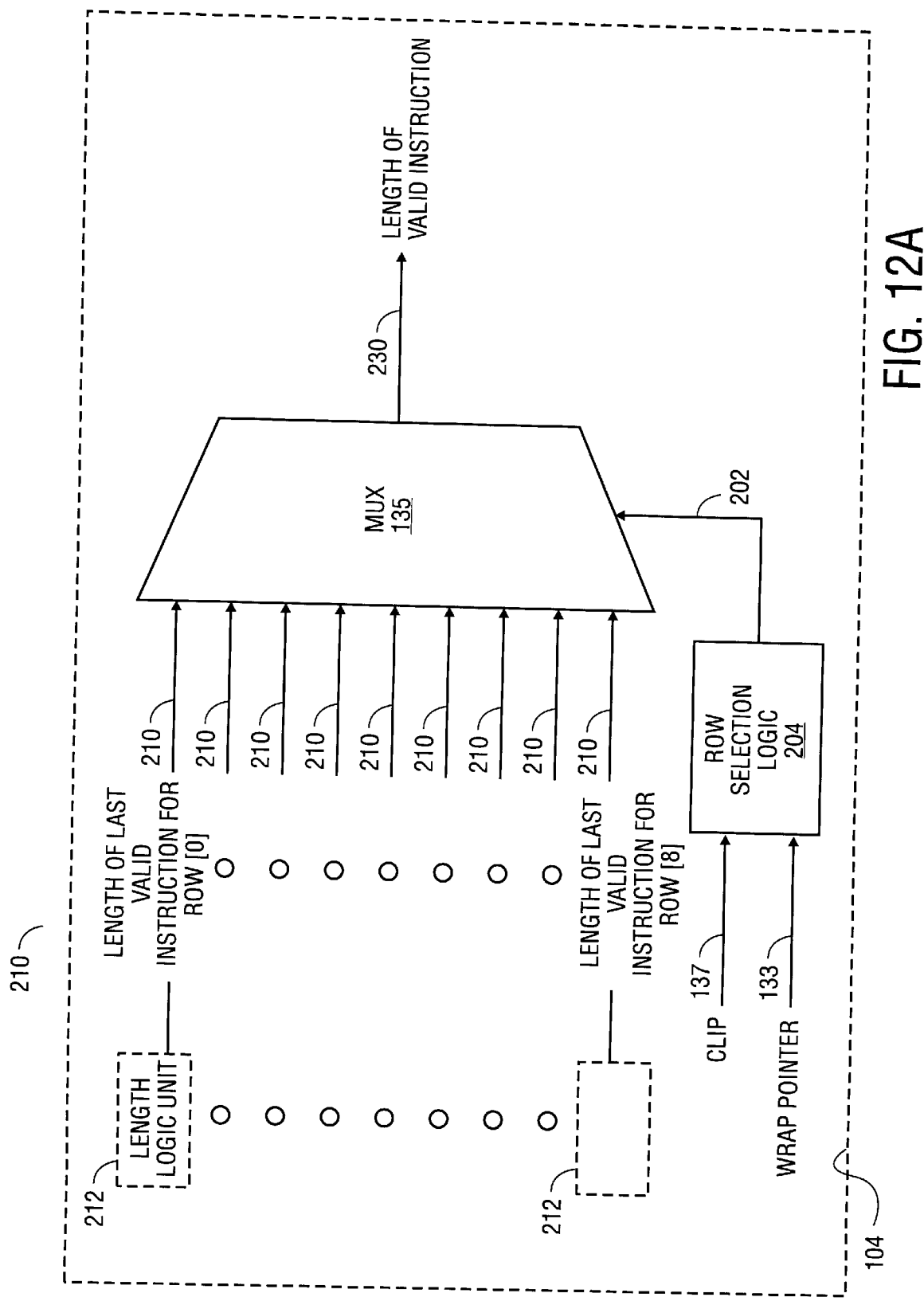
FIGS. 12A–12C are block diagrams illustrating details concerning overflow logic, according to an exemplary embodiment of the present invention, that may be incorporated within a byte-marking unit of the instruction pre-decoder.
Figure 12B:
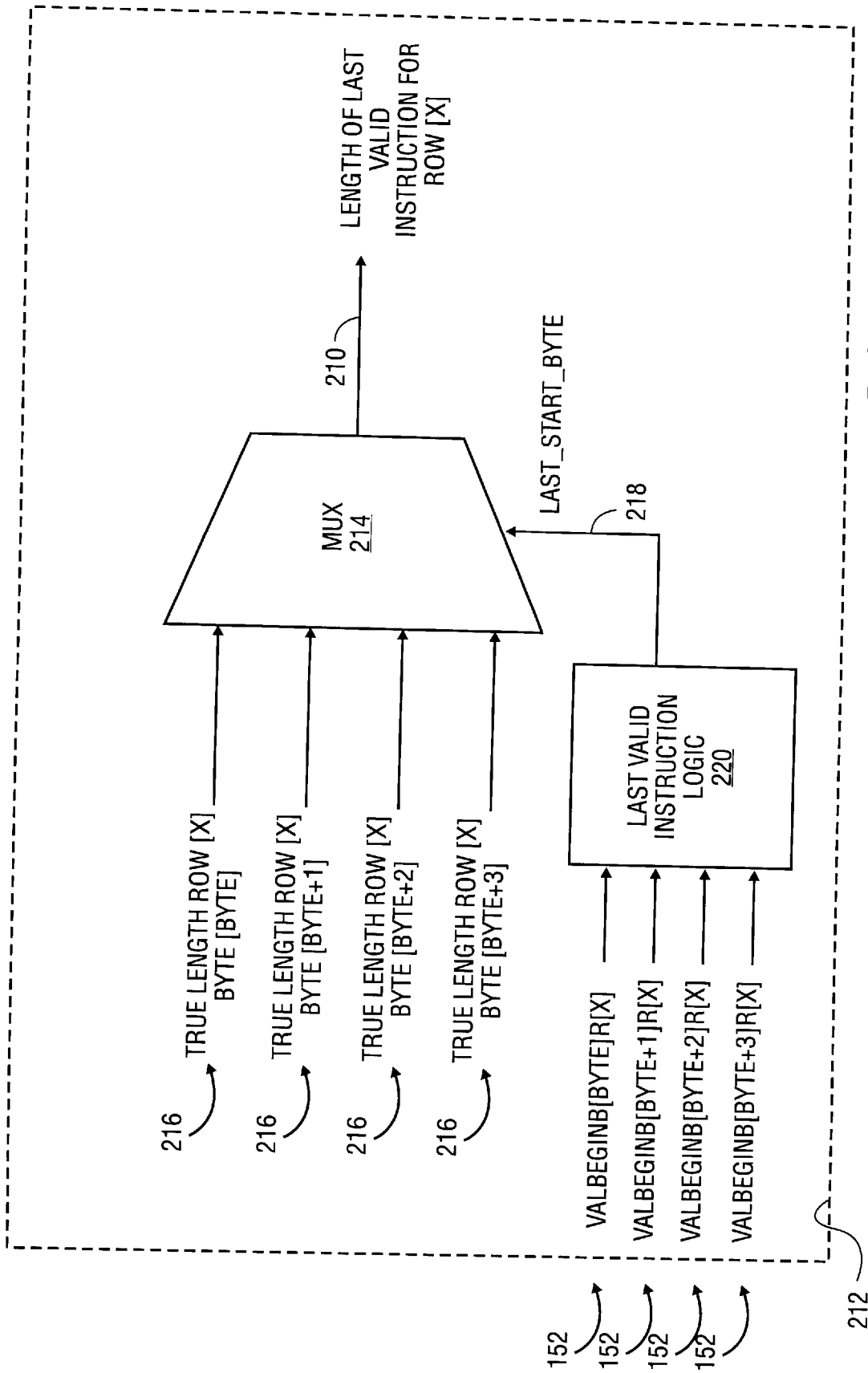
Figure 12C:
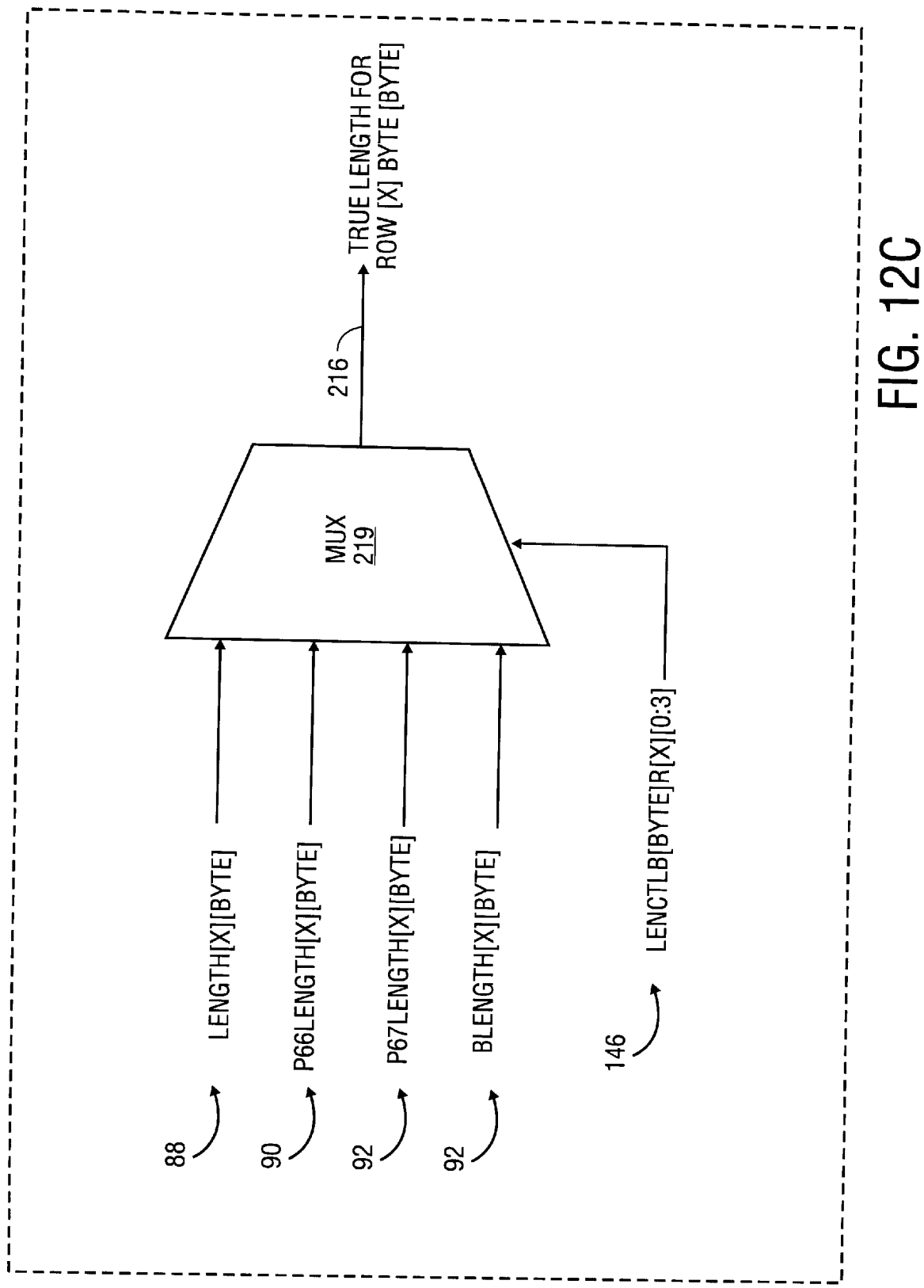

FIGS. 12A–12C are block diagrams illustrating details concerning overflow logic 101, according to an exemplary embodiment of the present invention. FIG. 12A illustrates an high-level view of the overflow logic 101, while FIGS. 12B and 12C illustrated structural details of sub-units within the overflow logic 101. Turning first to FIG. 12A, a multiplexer 200 is shown to receive a length value 210 for each row 106–122 within the array of byte marking sub-units 104. Each length value 210 indicates the length of a potential instruction commencing with the last START byte identified within each the rows 106–122 of the array of byte marking sub-units 104 (i.e., the last START byte for each assumption regarding a first START byte within the 4-byte block). In other words, each of the length values 210 indicates the length of instruction which would extend, or "overflow", beyond the 4-byte block under consideration by the lower 4-byte marking logic 102, were an assumption associated with the respective row valid. The multiplexer 200 is shown to select among the length values 210 responsive to a row selection signal 202 that is generated by row selection logic 204. The row selection logic 204 is shown to receive a Current Linear Instruction Pointer (CLIP) 137 and a wrap pointer signal 133 as inputs. The row selection logic 204 selects the CLIP 137 as the row selection signal 202 when the 4-byte block under consideration includes the first byte of an instruction stream, this first byte accordingly being identified by the CLIP 137. When considering a 4-byte block that does not include the first byte of an instruction stream, the row selection logic 204 outputs the wrap pointer signal 133 as the row selection signal 202. The length values 210 are shown to be generated by a respective length logic units 212 for each row of the array of byte marking sub-units 104 (i.e., for each assumption regarding the position of a START byte within the 4-byte block). Further details regarding the structure of each of the length logic unit 212 is illustrated in FIG. 12B. Specifically, each length logic unit 212 includes a multiplexer 214 that selects between "true" length values 216 for potential instructions that commence with each consecutive byte of the 4-byte block under consideration by the lower 4-byte marking logic 100. FIG. 12C illustrates exemplary circuitry by which each of the "true" length values 216 TRUE[ROW]LEN[0:3][BYTE] may be generated. Specifically, a multiplexer 219 selects between the "normal" speculative length value 88, the expanded data length value 90, the expanded address length value 92, and the expanded data and address length value 94 generated by the speculative length calculation sub-unit 78 for each byte. The multiplexer 219 is operated to select between the speculative length values 88–94 by the length control signal 146 for the respective byte of the respective row (or assumption). The length control signal 146, as detailed above, indicates which speculative length type (i.e., normal, expanded address, expanded data, or expanded address and expanded data length time) is to be utilized in view of prefixes that may have preceded the assumed START byte of the relevant row. Returning now to FIG. 12B, the multiplexer 214 selects between the "true" length values 216 responsive to a LAST_START_BYTE signal 218 that is generated by last valid instruction logic 220. The LAST_START_BYTE signal 218 indicates which of the bytes of the 4-byte block under consideration contains the last START byte of an instruction for each row (or assumption) represented by the array of byte marking sub-units 104. The last valid instruction logic 220 is shown to receive valid begin signals 152 for each of the bytes of the 4-byte block under consideration. As detailed above, each valid begin signal 152 indicates whether the respective byte position could potentially be the beginning of a new instruction. Accordingly, the last valid instruction logic 220 simply identifies the highest byte position of byte positions 0–3 for which a respective valid begin signal 152 is asserted, and generates the LAST_START_BYTE signal 218 to identify this highest byte position.

Returning to FIG. 12A, it will accordingly be appreciated that the length value 210 selected by the multiplexer 200 as a length output 230 comprises the length of an instruction commencing at the last START byte of a row pre-generated according to a valid assumption. Utilizing the above EQUATION (1), an overflow pointer signal 135 can be generated. The overflow pointer signal 135 points to a row within the upper 4-byte marking logic 102 that outputs precalculated bit pairs comprising the byte marking vectors for the upper 4-byte marking logic 102. The overflow pointer signal 135, more specifically, serves to operate selection logic, similar to the selection logic 130 shown in FIG. 8, within the upper 4-byte marking logic 102 to select the output of a row of byte marking sub-units as byte marking vectors outputted by the logic 102.

The wrap logic 103 operates in substantially the same manner as described above to generate a wrap pointer signal 133 that is utilized as described below to selects a length of a valid instruction and to select among the outputs of the rows of the array of byte marking sub-units 104.

The exemplary embodiment of the present invention proposes 4-byte chunks (rather than 8-byte chunks) be processed by the upper and lower byte marking logics 100 and 102 as:

1. Complexity (number of terms to compute) of the "valid begin" signal and the "length control" signal increase exponentially with the size of the byte chunk.
2. The above reason limits the amount of logic that can be done in one cycle and by extension in parallel.
3. An 8-byte chunk design may not be cost effective for described implementation and would require more "normal" rows, since the number of normal rows=n+2.
4. An 8-byte chunk design may make the overflow logic and wrap logic more serial dependent, having to use all 8-bytes instead of 4 at a time, which limits speed.
5. Conversely, a smaller chunk size may increase the serial dependency between chunks.

Nonetheless, the teachings of the present invention may be implemented within an 8-byte chunk design and the present application is intended to include within its scope such and other alternative embodiments.

Methodology

Figure 13:
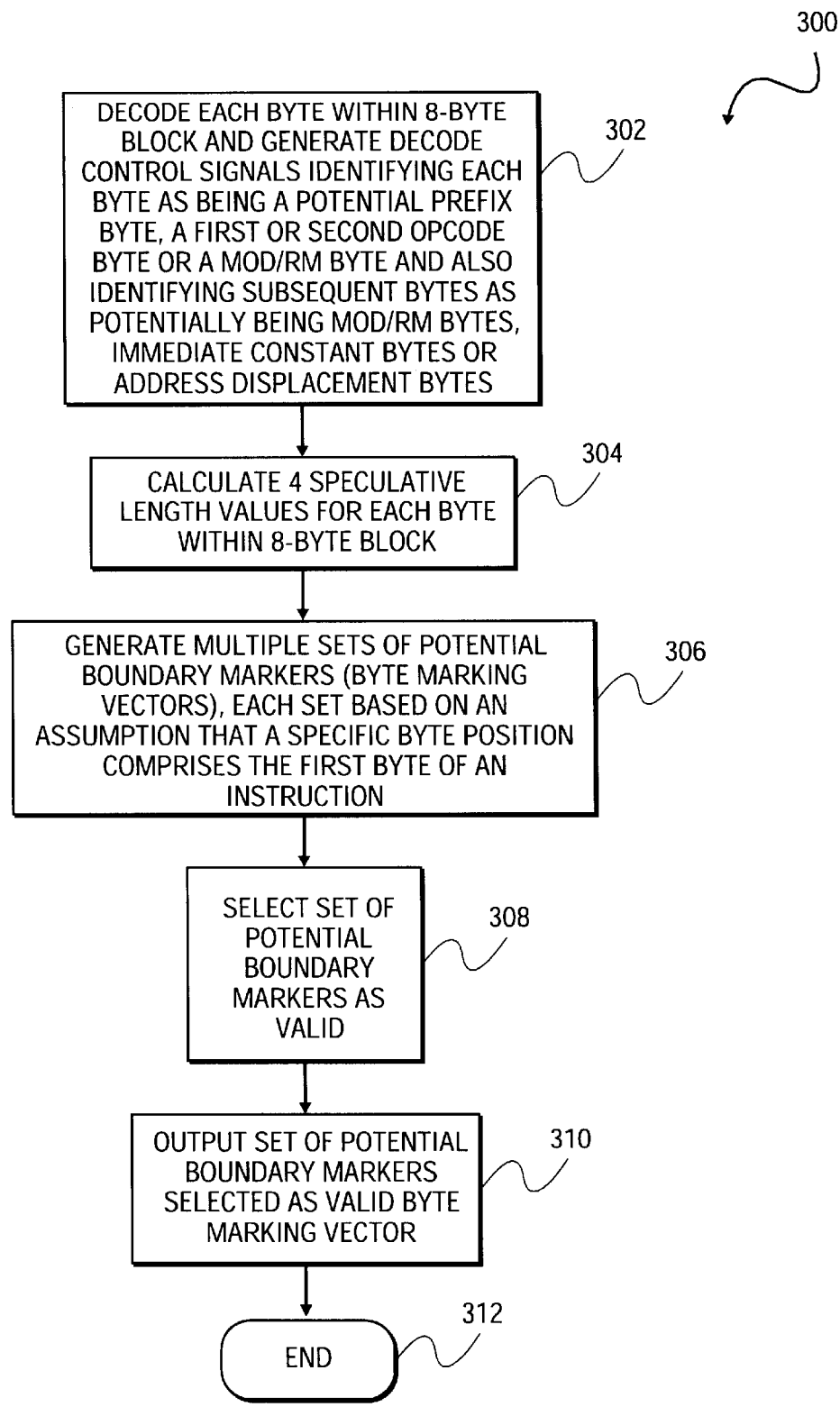
FIG. 13 is a flow chart illustrating a method, according to an exemplary embodiment of the present invention, of generating boundary markers for an instruction stream including variable-length instructions.

FIG. 13 is a flowchart illustrating a method 300, according to an exemplary embodiment of the present invention, of generating boundary markers for an instruction stream including variable-length instructions. The method 300 commences at step 302, where each byte within a 8-byte block is decoded by a respective decode sub-unit 73 within the opcode/prefix decode unit 71 to generate decode control signals 83 listed above in Table 1. The decode control signals 83 identify each byte as being a potential prefix byte, a first or second opcode byte, or a mod/RM byte. Each of the decode control signals 83 also identifies subsequent bytes following a byte under consideration as potentially being a mod/RM byte, an immediate constant byte or an address displacement byte. At step 304, the speculative length calculation unit 70 calculates four (4) speculative length values for each byte within the 8-byte block. Specifically, the length calculation sub-unit 78 associated with each of the bytes within the 8-byte block speculatively generates a normal address length value 88, an expanded data length value 90, an expanded address length value 92, and an expanded data and address length value 94. At step 306, the lower 4-byte marking logic 100 and the upper 4-byte marking logic 102 each generated multiple potential boundary marking vectors (e.g., a first (or START) byte marking vector 66 and a last (or END) byte marking vector 68 as shown in FIG. 4), each potential boundary marking vectors being based on an assumption regarding a boundary byte position within the 4-byte block being considered by the marking logics 100 or 102. Specifically, in the exemplary embodiment, each of the marking logics 100 and 102 generates 4 potential boundary marking vectors based on an assumption that each of the bytes within the respective 4-byte block under consideration comprises a START byte of instruction, a further potential boundary marking vector based on the assumption that the respective 4-byte block consideration contains no START bytes, and a further 3 potential boundary marked vectors based on the assumption that the first byte position (i.e., byte 0) contains a START byte and that respective data, address, and both data and address length changing prefixes have been encountered in the instruction stream. Accordingly, in the exemplary embodiment, a total of 9 potential boundary marking vectors may be generated by each of the upper and lower 4-byte marking logics 100 and 102. Further details regarding step 306 are provided below with reference to FIGS. 14 and 15.

At step 308, one of the sets of potential boundary markers (i.e., one of the boundary marking vectors) within each of the byte marking logics 100 and 102 is selected as being valid by the selection logic 130 within each of the logics 100 and 102. Further details regarding step 306 are provided below with reference to FIGS. 16 and 17. At step 310 each of the byte marking logics 100 and 102 outputs the potential boundary vector selected at step 306 a valid byte marking vector. The valid byte marking vector is then propagated from the instruction pre-decoder (IPD) 56 to the instruction steering unit 58, as described above with reference to FIG. 3.

Figure 14:
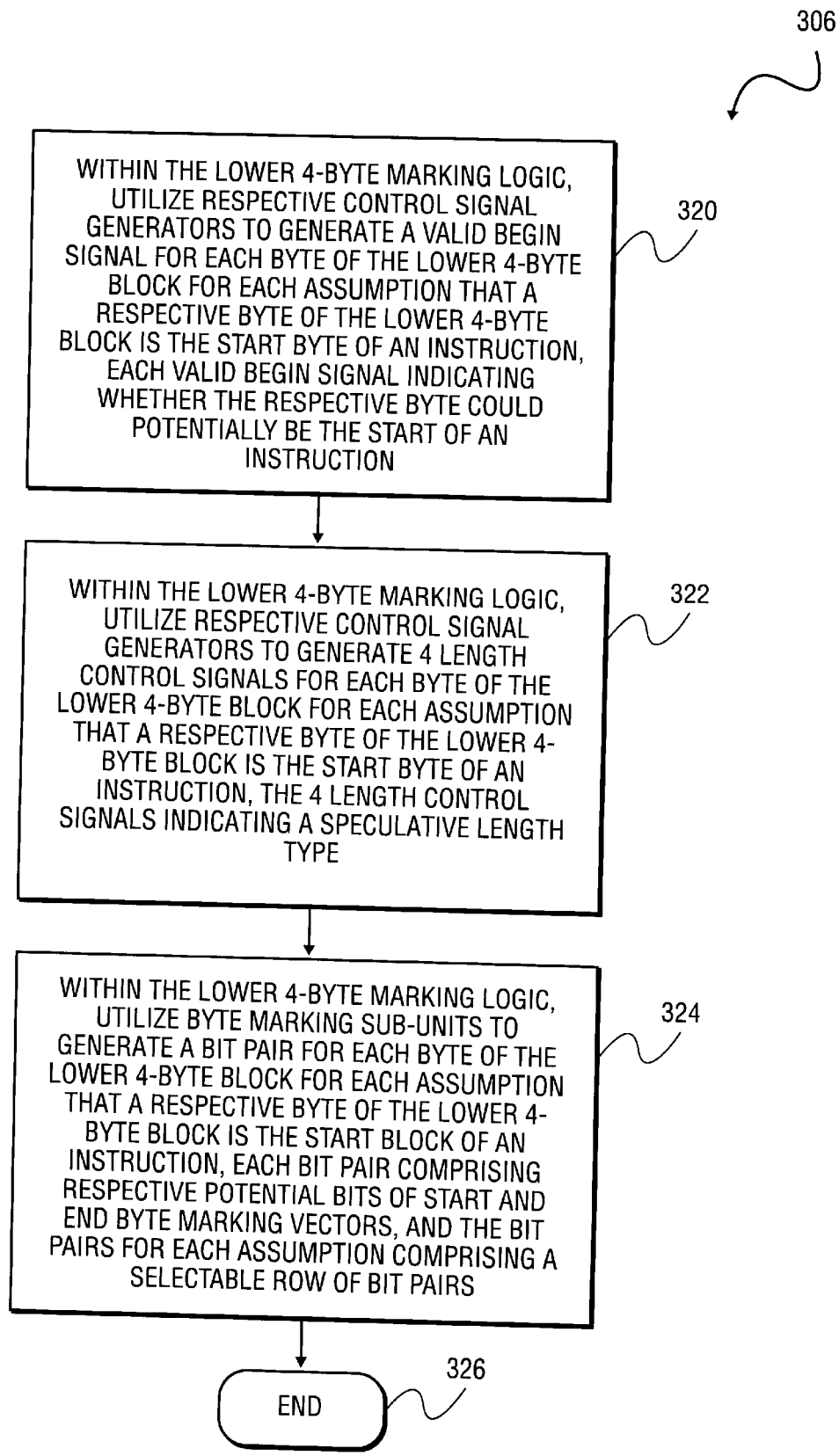
FIG. 14 is a flow chart illustrating a method, according to exemplary embodiment of the present invention, whereby lower 4-byte marking logic generates multiple sets of potential boundary markers, each set being based on an assumption regarding a boundary byte position.
Figure 15:
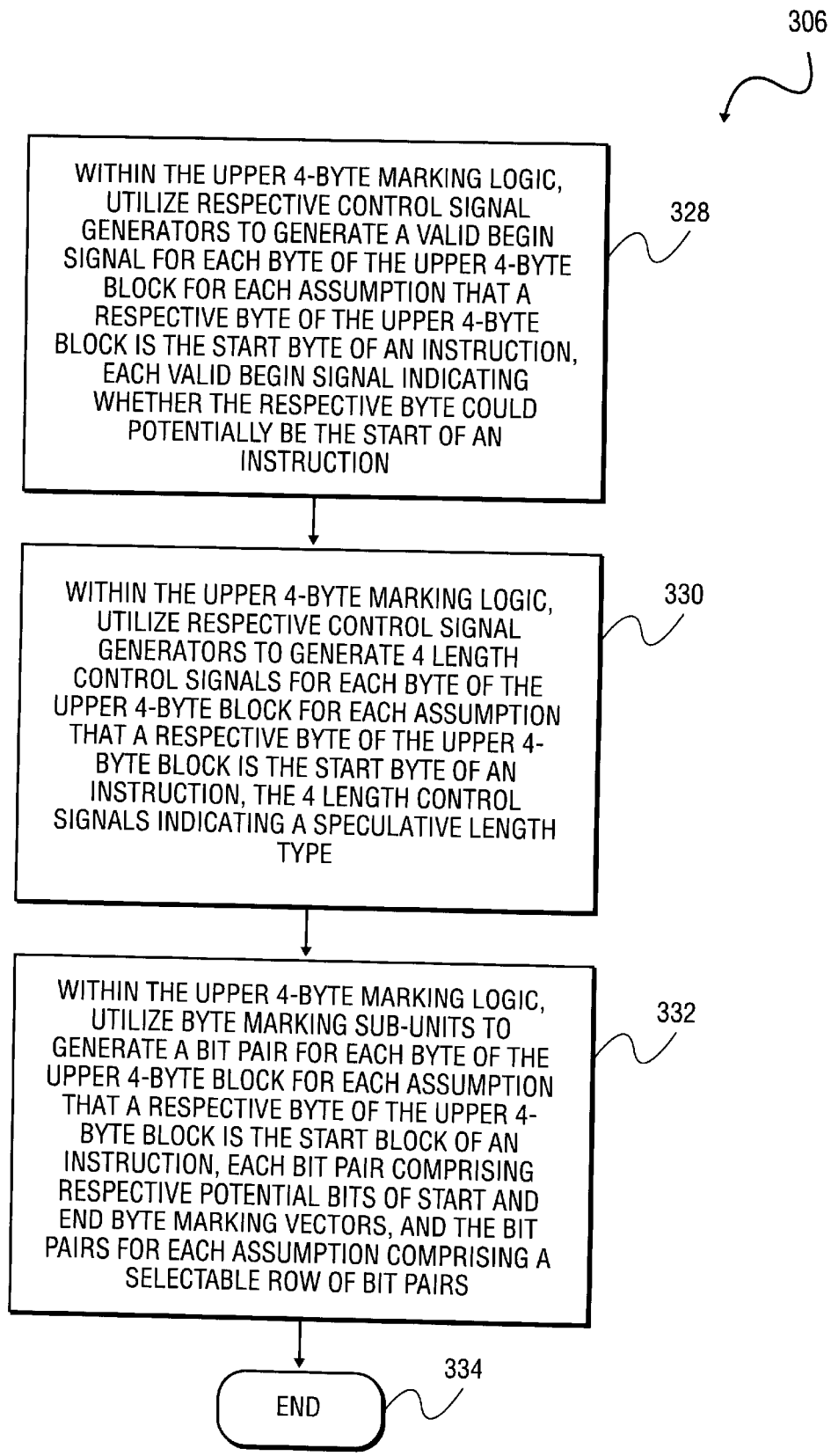
FIG. 15 is a flow chart illustrating a method, according to exemplary embodiment of the present invention, whereby upper 4-byte marking logic generates multiple sets of potential boundary markers, each set being based on an assumption regarding a boundary byte position.

FIGS. 14 and 15 are flowcharts respectively detailing the exemplary steps performed by the lower 4-byte marking logic 100 and the upper 4-byte marking logic 102 in performance of step 306 (i.e., the generation of multiple sets of potential boundary markers (or boundary vector), each set (or vector) being based on an assumption regarding a boundary byte position) shown in FIG. 13. Turning first to FIG. 14, at step 320, the lower 4-byte marking logic 100 utilizes the control signals generators 103, associated with each of the active byte marking sub-units 104, to generate a valid begin signal 152. Accordingly, a valid begin signal 152 is generated for each active byte marking sub-unit 104, each of the sub-units 104 being associated with a specific byte position and being located in a row of the array that corresponds to, or is associated with, an assumption regarding a boundary byte position. Each of the valid begin signals 152 indicates whether the respective byte position, for the respective assumption, could potentially contain the START bytes of an instruction. As detailed above with reference to FIG. 9, each valid begin signal 152 is generated utilizing the length values 150 generated by the speculative length calculation unit 70 and the decode control signals 83 generated for each byte position by the opcode/prefix decode unit 71.

At step 322,the lower 4-byte marking logic 100 utilizes the control signals generators 103 to generate four length control signals 146 for each active byte marking sub-unit 104. The four length control signals 146 indicate the appropriate speculative length type to be utilized within the byte marking logic 100. At step 324, each of the byte marking sub-units 104 then generates a bit pair according to the assumption attributed to a relevant row including the respective sub-unit 104. Each of the byte marking sub-units 104 may output a bit pair according to the exemplary equations listed above (i.e., [OpMrkRow[ROW]Col[[BYTE] and EndMrkRow[ROW]Col[BYTE]). The step 306 then terminates at 326.

FIG. 15 is a flowchart illustrating the steps that are performed by the upper 4-byte marking logic 102 to generate a set of boundary markers for the upper 4 bytes of an 8-byte block under consideration. The steps illustrated in FIG. 15 correspond substantially to those illustrated in FIG. 14, as performed by the lower 4-byte marking logic 100.

Figure 16:
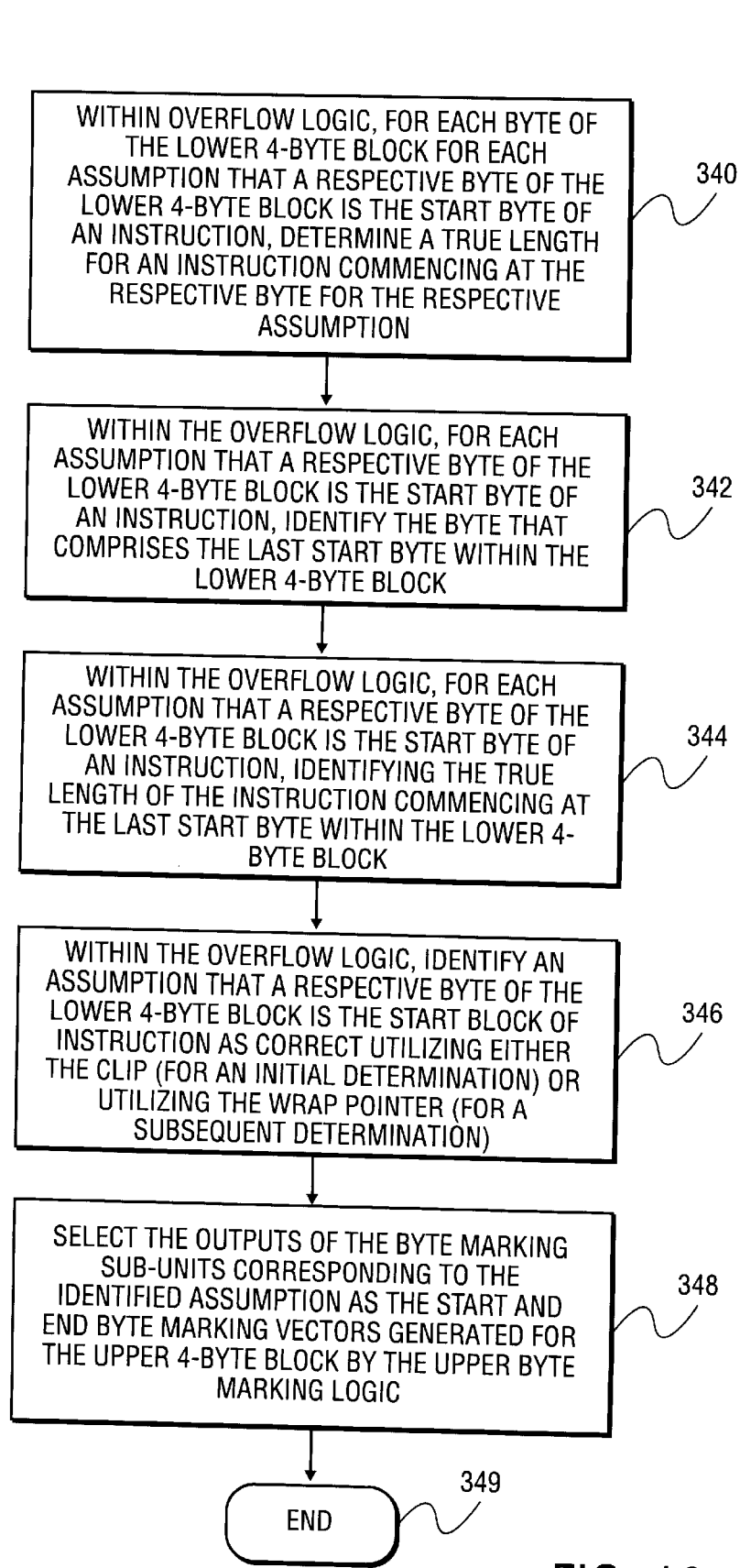
FIG. 16 is a flow chart illustrating a method, according to exempt embodiment of the present invention, whereby lower 4-byte marking logic selects one of multiple sets of potential boundary markers as being valid.
Figure 17:
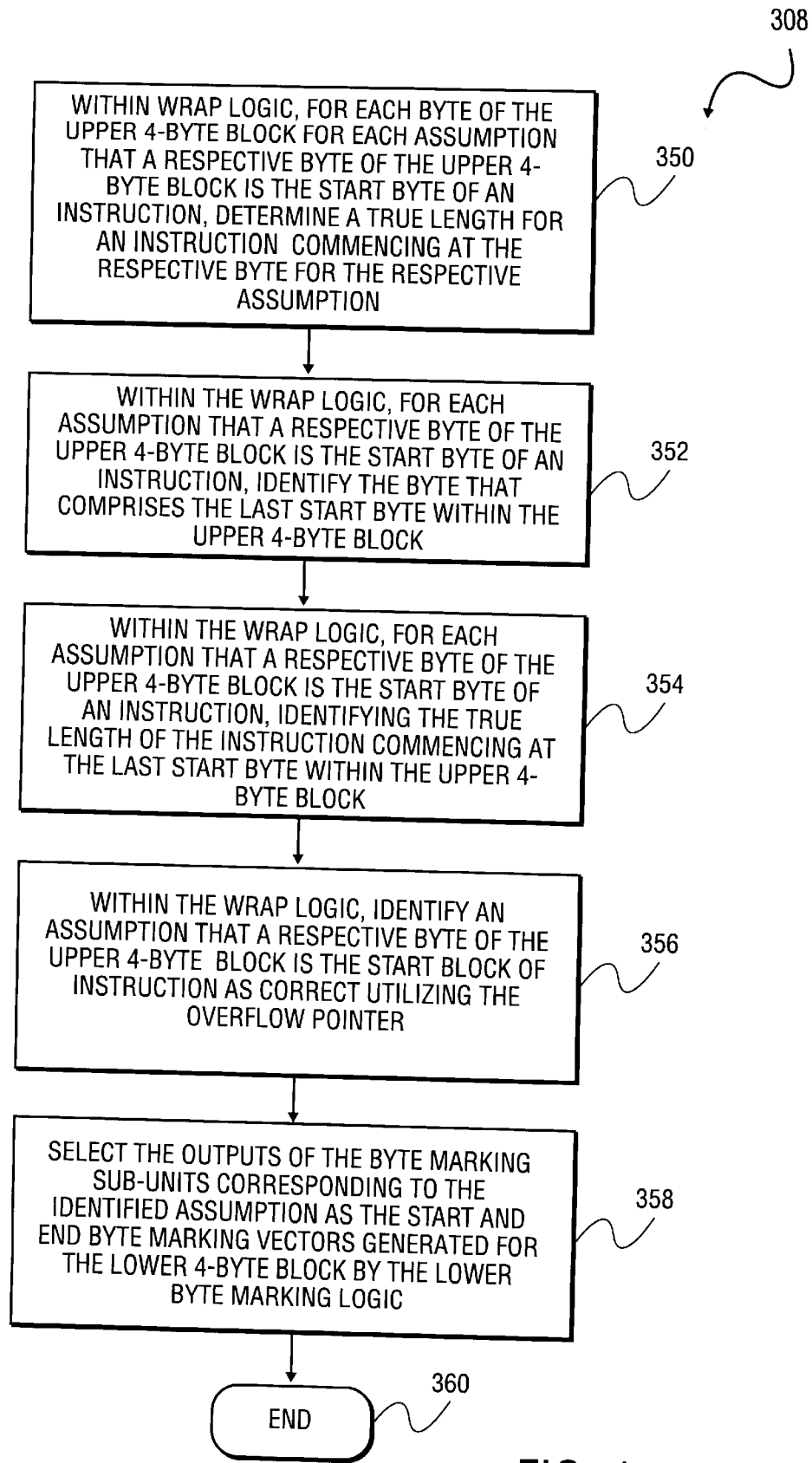
FIG. 17 is a flow chart illustrating a method, according to an exemplary embodiment of the present invention, whereby upper 4byte marking logic selects one of multiple sets of potential boundary markers as being valid.

FIGS. 16 and 17 are flowcharts respectively detailing the exemplary steps performed by the lower 4-byte marking logic 100 and the upper 4-byte marking logic 102 in performance of the selection step 308 of the method 300, as illustrated in FIG. 13. Turning first to FIG. 16, the step 308 is performed by logic embodied within the overflow logic 101. At step 340, for each byte of the lower 4-byte block and for each assumption regarding a boundary byte position (e.g., the nine assumptions embodied in the array of byte marking sub-units 104), a true length for a potential instruction commencing with each byte for each assumption is determined. Specifically, in one exemplary embodiment, the multiplexer 219 shown in FIG. 12C selects among the speculative length values 88–94 based on the output of the four length control signals 146 to generate a true length value 216 for a particular byte for a particular assumption. At step 342, for each assumption regarding a boundary byte position, the byte position within the lower 4-byte block that comprises the last START byte is identified. In the exemplary embodiment of the present invention, this step may be performed by the last valid instruction logic 220 illustrated in FIG. 12B, which receives the valid begin signals 152 for each of the byte positions for the lower 4-byte block as input, and generates the LAST_START_BYTE signal 218 indicating a byte position. At step 344, the true length of an instruction commencing at the last START byte within the lower 4-byte block is identified. In an exemplary embodiment, this step may be performed by the circuitry illustrated in FIG. 12B, where the last valid instruction logic 220 operates a multiplexer 214 to select among true length values 216 generated for each byte position of the 4-byte block, and to output the length value 210. At step 346, one of the assumptions regarding the boundary byte position within the lower 4-byte block (e.g., one of the nine assumptions mentioned above) is identified as being correct or valid. This determination, in one exemplary embodiment of the present invention, is made by the row selection logic 204 responsive either to the CLIP 137 or a wrap pointer signal 133 received from the wrap logic 103, the row selection logic 204 then outputting the row selection signal 202 indicative of the determination. At step 348, the outputs of the 4-byte marking sub-units 104 (of the upper 4-byte marking logic 102), corresponding to the assumption determined to be correct at step 346, are selected as the boundary markers outputted from the upper 4-byte marking logic 102 according to an overflow pointer signal 135 generated in the manner described above. In other words, the assumption made by the overflow logic 101 determines state of the overflow pointer signal 135 which in turn determines which assumption is identified as being correct by the upper 4-byte marking logic 102.

FIG. 17 is a flowchart illustrating the steps performed by the wrap logic 103 which cause an assumption regarding the boundary byte position (and accordingly a row of byte marking sub-units 104) to be selected within the lower 4-byte marking logic 100. The steps 350–358 illustrated in FIG. 17 correspond substantially to the steps 340–348 illustrates in FIG. 16, but differ in that, at step 356, the identification of a valid assumption is determined utilizing only an overflow pointer signal 135, and not a CLIP 137.

The present invention, an exemplary embodiment of which is described above, is particularly advantageous in that it reduces delays, resulting from the inherently serial nature of the operation, in the generation of boundary markers (or byte-marking vectors) for an instruction stream including variable-length instructions. This is achieved by making assumptions regarding the location of a boundary bytes within a predetermined set of bytes, and then pre-calculating (in a parallel manner) speculative sets of boundary markers for each of the assumptions. When in a position to determine which of the assumptions is in fact valid and correct, the present invention then teaches selecting the pre-calculated speculative set of boundary markers corresponding to the valid assumption regarding the location of a boundary byte. Accordingly, the time required for actual generation of a set of boundary markers for the predetermined set of bytes is absorbed within the time required to determine the location of a subsequent boundary byte.

Thus, a method and apparatus for generating boundary markers for an instruction stream including variable length instructions have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of generating boundary markers for an instruction stream including variable-length instructions, the method comprising:

generating a plurality of sets of potential boundary markers for a predetermined set of bytes within the instruction stream, each set of potential boundary markers being generated based on a respective assumption regarding a boundary byte position within the predetermined set of bytes; and selecting a set of boundary markers, from the plurality of sets of potential boundary markers, as a valid set of boundary markers, wherein the generation of the plurality of sets of potential boundary markers is performed prior to a determination as to validity of assumptions regarding the boundary byte position within the predetermined set of bytes.

2. The method of claim 1 wherein the generation comprises generating a first set of potential boundary markers, within the plurality of sets of potential boundary markers, based on an assumption that a first byte, within the predetermined set of bytes and associated with the first set of potential boundary markers, comprises a start byte of an instruction within the instruction stream.

3. The method of claim 1 wherein the generation comprises generating a first set of potential boundary markers, within the plurality of sets of potential boundary markers, based on an assumption that a first byte, within the predetermined set of bytes and associated the first set of potential boundary markers, comprises an end byte of an instruction within the instruction stream.

4. The method of claim 1 wherein the generation comprises generating a second set of potential boundary markers, within the plurality of sets of potential boundary markers, based on an assumption that the predetermined set of bytes does not include a boundary byte.

5. The method of claim 1 wherein the generation comprises generating a third set of potential boundary markers, within the plurality of sets of boundary markers, based on an assumption that a length changing prefix was encountered within the instruction stream.

6. The method of claim 5 wherein the generation of the third set of potential boundary markers is based on an assumption that a data length changing prefix was encountered within the instruction stream.

7. The method of claim 5 wherein the generation of the third set of potential boundary markers is based on an assumption that an address length changing prefix was encountered within the instruction stream.

8. The method of claim 5 wherein the generation of the third set of potential boundary markers is based on an assumption that both an address length changing prefix and a data length changing prefix were encountered within the instruction stream.

9. The method of claim 1 wherein the generation of the plurality of sets of potential boundary markers includes decoding each byte within the predetermined set of bytes and generating decode control signals to identify each byte within the predetermined set of bytes as potentially comprising a prefix byte, an opcode byte or a mod/RM byte.

10. The method of claim 9 wherein the generation of the plurality of sets of boundary markers includes generating a length control signal for a byte based on a specific assumption regarding the boundary byte position within the predetermined set of byte, the length control signal indicating a length changing condition to be applied when generating the set of boundary markers based on an assumption regarding the boundary byte position.

11. The method of claim 10 wherein the length control signal is generated utilizing decode control signals that identify the byte as comprising a potential length changing prefix byte.

12. The method of claim 10 wherein the decode control signals identify the byte as comprising a potential data or address length changing prefix.

13. The method of claim 10 wherein the generation of the plurality of sets of boundary markers includes generating a potential boundary marker for a byte utilizing a speculative length value, that indicates a speculative length of an instruction for which the byte comprises a boundary byte, and the length control signal.

14. The method of claim 9 wherein the decode control signals identify bytes subsequent to each byte as potentially comprising a mod/RM byte, an immediate constant byte, or a displacement byte.

15. The method of claim 1 wherein the generation of the plurality of sets of boundary markers includes calculating a first speculative length value for each byte within the predetermined set of bytes, the first speculative length value for each byte indicating a length of a potential instruction for which the respective byte is a boundary byte.

16. The method of claim 15 wherein the generation of the plurality of sets of boundary markers includes calculating a second speculative length value for each byte within the predetermined set of bytes, the second speculative length value for each byte indicating a length of a potential instruction for which a respective byte is a boundary byte, based on an assumption that a length changing prefix was encountered in the instruction stream prior to the respective byte.

17. The method of claim 16 wherein the generation of the plurality of sets of boundary markers includes generating four speculative length values for each byte within the predetermined set of bytes, the four speculative length values for a respective byte being based on respective assumptions that an address length changing prefix, a data length changing prefix, both an address and a data length changing prefix and no length changing prefixes were encountered in the instruction stream prior to the respective byte.

18. The method of claim 1 wherein the generation of the plurality of sets of boundary markers includes generating a valid begin control signal for a specific byte within the predetermined set of bytes based on a specific assumption regarding the boundary byte position within the predetermined set of bytes, the valid begin control signal indicating whether the specific byte is potentially a boundary byte.

19. The method of claim 18 wherein the generation of the valid begin control signal for the specific byte is performed utilizing a speculative length value that indicates a speculative length of an instruction for which the specific byte comprises a boundary byte.

20. The method of claim 19 wherein the generation of the valid begin control signal for the specific byte is performed utilizing decode control signals that identify the byte as comprising a potential length changing prefix byte.

21. The method of claim 18 wherein the generation of the plurality of sets of boundary markers includes generating a potential boundary marker for each byte utilizing a speculative length value, that indicates a speculative length of an instruction for which the byte comprises a boundary byte, and the valid begin control signal.

22. The method of claim 1 including the determination of the validity of each of the assumptions regarding a boundary byte position within the predetermined set of bytes.

23. The method of claim 22 wherein the selection comprises selecting a set of boundary markers corresponding to an assumption, regarding a boundary byte position within the predetermined set of bytes, determined to be valid.

24. The method of claim 1 wherein the selection comprises determining, for each assumption for which a set of potential boundary markers is generated, a true length value for a potential instruction commencing with each byte of the predetermined set of bytes.

25. The method of claim 24 wherein the determination of the true length value for a potential instruction commencing with each byte comprises selecting between (1) a first speculative length value generated based on an assumption that no length changing prefix was encountered in the instruction stream prior to the respective byte, and (2) a second speculative length value generated based on an assumption that a length changing prefix was encountered in the instruction stream prior to the respective byte.

26. The method of claim 24 wherein the selection comprises identifying, for each assumption for which a set of a potential boundary markers is generated, a byte within the predetermined set of bytes that comprises the last start byte of a potential instruction within the predetermined set of bytes.

27. The method of claim 26 wherein the selection comprises determining, for each assumption for which a set of potential boundary markers is generated, a true length value of a potential instruction commencing with the byte within the predetermined set of bytes that comprises the last byte of a potential instruction within the predetermined set of bytes.

28. The method of claim 27 wherein the selection comprises identifying an assumption as a valid assumption based on a Current Linear Instruction Pointer (CLIP).

29. The method of claim 27 wherein the s election comprises identifying a first assumption as a valid assumption based on a pointer generated responsive to a previous identification of a second assumption as a valid assumption.

30. A method of generating boundary markers for an instruction stream including variable-length instructions, the method including:
  generating M sets of potential boundary markers for each of M assumptions regarding a position of a boundary byte within a set of N bytes;
  identifying one of the M assumptions as being valid; and
  selecting a set of boundary markers generated for the assumption identified as being valid boundary markers for the set of N bytes.

31. The method of claim 30 wherein the generating the M sets of potential boundary markers includes generating N sets of potential boundary markers, each of the N sets of potential boundary markers being generated based on an assumption that each of the respective N bytes of the set of N bytes comprises a start byte of an instruction within the instruction stream.

32. The method of claim 31 wherein each of the N sets of potential boundary markers is generated based on an assumption that potential instructions commencing at each of the N bytes are not influenced by length changing prefixes in the instruction stream.

33. Logic for generating boundary markers for an instruction stream including variable-length instructions, the logic comprising:

marking logic to generate a plurality of sets of potential boundary markers for a predetermined set of bytes within the instruction stream, each set of potential boundary markers being generated based on a respective assumption regarding a boundary byte position within the predetermined set of bytes; and selection logic to select a set of boundary markers, from the plurality of sets of potential boundary markers, as a valid set of boundary markers, wherein the marking logic is to generate the plurality of sets of boundary markers prior to a determination as to validity of assumptions regarding the boundary byte position within the predetermined set of bytes.

34. The logic of claim 33 wherein the marking logic generates a first set of potential boundary markers, within the plurality of sets of potential boundary markers, based on an assumption that a first byte, within the predetermined set of bytes and associated with the first set of potential boundary markers, comprises a start byte of an instruction within the instruction stream.

35. The logic of claim 33 wherein the marking logic generates a first set of potential boundary markers, within the plurality of sets of potential boundary markers, based on an assumption that a first byte, within the predetermined set of bytes and associated the first set of potential boundary markers, comprises an end byte of an instruction within the instruction stream.

36. The logic of claim 33 wherein the marking logic generates a second set of potential boundary markers, within the plurality of sets of potential boundary markers, based on an assumption that the predetermined set of bytes does not include a boundary byte.

37. The logic of claim 33 wherein the marking logic generates a third set of potential boundary markers, within the plurality of sets of boundary markers, based on an assumption that a length changing prefix was encountered within the instruction stream.

38. The logic of claim 37 wherein the marking logic generates the third set of potential boundary markers based on an assumption that a data length changing prefix was encountered within the instruction stream.

39. The logic of claim 37 wherein the marking logic generates the third set of potential boundary markers based on an assumption that an address length changing prefix was encountered within the instruction stream.

40. The logic of claim 37 wherein the marking logic generates the third set of potential boundary markers based on an assumption that both an address length changing prefix and a data length changing prefix were encountered within the instruction stream.

41. The logic of claim 33 including decode logic to decode each byte within the predetermined set of bytes and to generate decode control signals to identify each byte within the predetermined set of bytes as potentially comprising a prefix byte, an opcode byte or a mod/RM byte.

42. The logic of claim 41 wherein the decode control signals identify bytes subsequent to each byte as potentially comprising a mod/RM byte, an immediate constant byte, or a displacement byte.

43. The logic of claim 33 including length calculation logic to calculate a first speculative length value for each byte within the predetermined set of bytes, the first speculative length value for each byte indicating a length of a potential instruction for which the respective byte is a boundary byte.

44. The logic of claim 43 wherein the length calculation logic calculates a second speculative length value for each byte within the predetermined set of bytes, the second speculative length value for each byte indicating a length of a potential instruction for which a respective byte is a boundary byte, based on an assumption that a length changing prefix was encountered in the instruction stream prior to the respective byte.

45. The logic of claim 44 wherein the length calculation logic calculates four speculative length values for each byte within the predetermined set of bytes, the four speculative length values for a respective byte being based on respective assumptions that an address length changing prefix, a data length changing prefix, both an address and a data length changing prefix and no length changing prefixes were encountered in the instruction stream prior to the respective byte.

46. The logic of claim 33 including control signal logic to generate a length control signal for a byte based on a specific assumption regarding the boundary byte position within the predetermined set of byte, the length control signal indicating a length changing condition to be applied when generating the set of boundary markers based on an assumption regarding the boundary byte position.

47. The logic of claim 46 wherein the length control signal is generated utilizing decode control signals that identify the byte as comprising a potential length changing prefix byte.

48. The logic of claim 46 wherein the decode control signals identify the byte as comprising a potential data or address length changing prefix.

49. The logic of claim 46 wherein the control signal logic generates a valid begin control signal for a specific byte within the predetermined set of bytes based on a specific assumption regarding the boundary byte position within the predetermined set of bytes, the valid begin control signal indicating whether the specific byte is potentially a boundary byte.

50. The logic of claim 49 wherein the control signal logic utilizes a speculative length value that indicates a speculative length of an instruction for which the specific byte comprises a boundary byte to generate the valid begin control signal for the specific byte.

51. The logic of claim 50 wherein the control signal logic utilizes decode control signals that identify the byte as comprising a potential length changing prefix byte to generate the valid begin control signal for the specific byte.

52. The logic of claim 49 wherein the marking logic generates a potential boundary marker for each byte utilizing a speculative length value, that indicates a speculative length of an instruction for which the byte comprises a boundary byte, and the valid begin control signal.

53. The logic of claim 46 wherein the marking logic generates a potential boundary marker for a byte utilizing a speculative length value, that indicates a speculative length of an instruction for which the byte comprises a boundary byte, and the length control signal.

54. The logic of claim 33 wherein the selection logic determines the validity of each of the assumptions regarding a boundary byte position within the predetermined set of bytes.

55. The logic of claim 54 wherein the selection logic selects a set of boundary markers corresponding to an assumption, regarding a boundary byte position within the predetermined set of bytes, determined to be valid.

56. The logic of claim 33 wherein the selection logic determines, for each assumption for which a set of potential boundary markers is generated, a true length value for a potential instruction commencing with each byte of the predetermined set of bytes.

57. The logic of claim 56 wherein the determination by the selection logic of the true length value for a potential instruction commencing with each byte comprises selecting between (1) a first speculative length value generated based on an assumption that no length changing prefix was encountered in the instruction stream prior to the respective byte, and (2) a second speculative length value generated based on an assumption that a length changing prefix was encountered in the instruction stream prior to the respective byte.

58. The logic of claim 56 wherein the selection logic identifies, for each assumption for which a set of a potential boundary markers is generated, a byte within the predetermined set of bytes that comprises a last start byte of a potential instruction within the predetermined set of bytes.

59. The logic of claim 58 wherein the selection logic determines, for each assumption for which a set of potential boundary markers is generated, a true length value of a potential instruction commencing with the byte within the predetermined set of bytes that comprises the last byte of a potential instruction within the predetermined set of bytes.

60. The logic of claim 59 wherein the selection logic identifies an assumption as a valid assumption based on a Current Linear Instruction Pointer (CLIP).

61. The method of claim 59 wherein the selection logic identifies a first assumption as a valid assumption based on a pointer generated responsive to a previous identification of a second assumption as a valid assumption.

62. An instruction pre-decoder to generate boundary markers for an instruction stream including variable-length instructions, the marking logic comprising:

marking logic to generate M sets of potential boundary markers for each of M assumptions regarding a position of a boundary byte within a set of N bytes;

selection logic to identify one of the M assumptions as being valid and to select a set of boundary markers generated for the assumption identified as being valid as valid boundary markers for the set of N bytes.

63. The instruction pre-decoder of claim 62 wherein the marking logic generates N sets of potential boundary markers, each of the N sets of potential boundary markers being generated based on an assumption that each of the respective N bytes of the set of N bytes comprises a start byte of an instruction within the instruction stream.

64. The instruction pre-decoder of claim 62 wherein the marking logic generates each of the N sets of potential boundary markers based on an assumption that potential instructions commencing at each of the N bytes are not influenced by length changing prefixes in the instruction stream.

65. Logic for generating boundary markers for an instruction stream including variable-length instructions, the logic comprising:

first means for generating a plurality of sets of potential boundary markers for a predetermined set of bytes within the instruction stream, each set of potential boundary markers being generated based on a respective assumption regarding a boundary byte position within the predetermined set of bytes; and second means for selecting a set of boundary markers, from the plurality of sets of potential boundary markers, as a valid set of boundary markers, wherein the first means is for generating the plurality of sets of boundary markers prior to a determination as to validity of assumptions regarding the boundary byte position within the predetermined set of bytes.

* * * * *